(12) United States Patent
Lin et al.

(10) Patent No.: US 12,548,619 B2
(45) Date of Patent: Feb. 10, 2026

(54) DEVICE AND CIRCUIT WITH VOLTAGE SUPPRESSION

(71) Applicant: TAIWAN SEMICONDUCTOR MANUFACTURING COMPANY, LTD., Hsinchu (TW)

(72) Inventors: Chien-Chen Lin, Kaohsiung (TW); Wei Min Chan, New Taipei (TW); Kao-Cheng Lin, Taipei (TW); Wei-Cheng Wu, Hsinchu (TW); Pei-Yuan Li, New Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 165 days.

(21) Appl. No.: 18/321,557

(22) Filed: May 22, 2023

(65) Prior Publication Data

US 2024/0395316 A1    Nov. 28, 2024

(51) Int. Cl.
G11C 11/417    (2006.01)
(52) U.S. Cl.
CPC ................. G11C 11/417 (2013.01)
(58) Field of Classification Search
CPC .................................... G11C 11/417
USPC .......................................... 365/174
See application file for complete search history.

(56) References Cited

U.S. PATENT DOCUMENTS

| 5,808,954 | A  | * | 9/1998 | Ichikawa | G11C 8/08 327/535 |
| 2007/0140037 | A1 | * | 6/2007 | Khamesra | G11C 5/148 365/230.06 |
| 2020/0144270 | A1 | * | 5/2020 | Hwang | G11C 11/4023 |
| 2023/0260570 | A1 | * | 8/2023 | Lin | G11C 8/08 365/154 |

OTHER PUBLICATIONS

U.S. Appl. No. 17/673,025, filed Feb. 16, 2022, Lin et al.

* cited by examiner

*Primary Examiner* — Alexander Sofocleous
*Assistant Examiner* — Duy H Luong
(74) *Attorney, Agent, or Firm* — Birch, Stewart, Kolasch & Birch, LLP

(57) ABSTRACT

A memory device is provided. The memory device comprises a memory cell, a first power rail and a suppressing circuit. The memory cell is coupled to a word line. The first power rail transmits a first supply voltage. The suppressing circuit comprises a first transistor and a second transistor. The first transistor is diode-connected, coupled to the word line, and disposed at a first layer. The second transistor is diode-connected coupled between the first transistor and the first power rail, and disposed at a second layer under the first layer. The first transistor and the second transistor overlap with each other in a layout view.

20 Claims, 29 Drawing Sheets

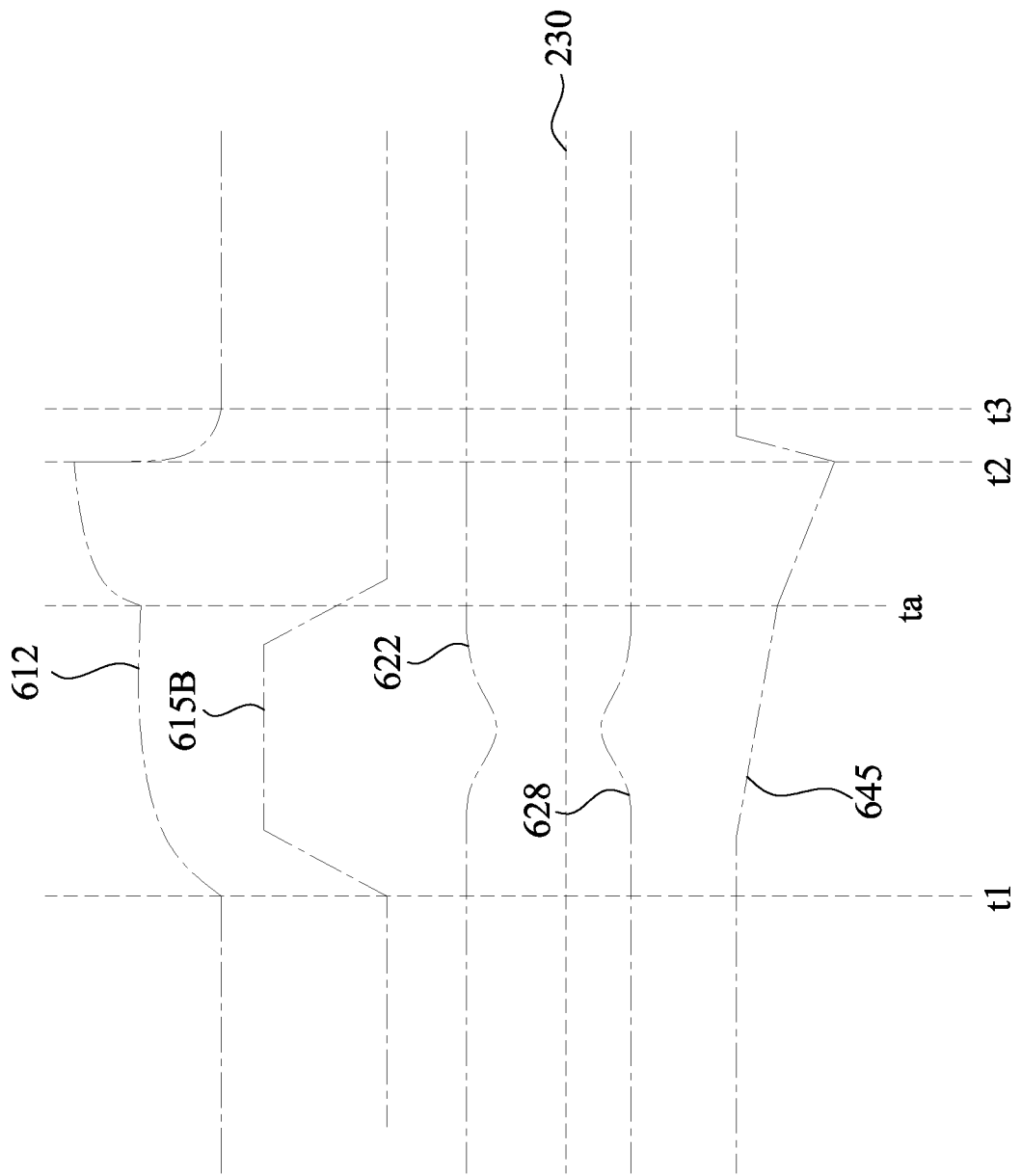

DEVICE AND CIRCUIT WITH VOLTAGE SUPPRESSION

BACKGROUND

Developments in electronic devices, such as computers, portable devices, smart phones, internet of thing (IoT) devices, etc., have prompted increased demands for memory devices. Technological advances in materials and IC design have produced generations of memory devices. In some approaches, optimization of metal track arrangement is considered to reach higher area utilization.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 27 is a timing diagram showing an operation of a memory device, in accordance with some embodiments.

DETAILED DESCRIPTION

Figure 1:
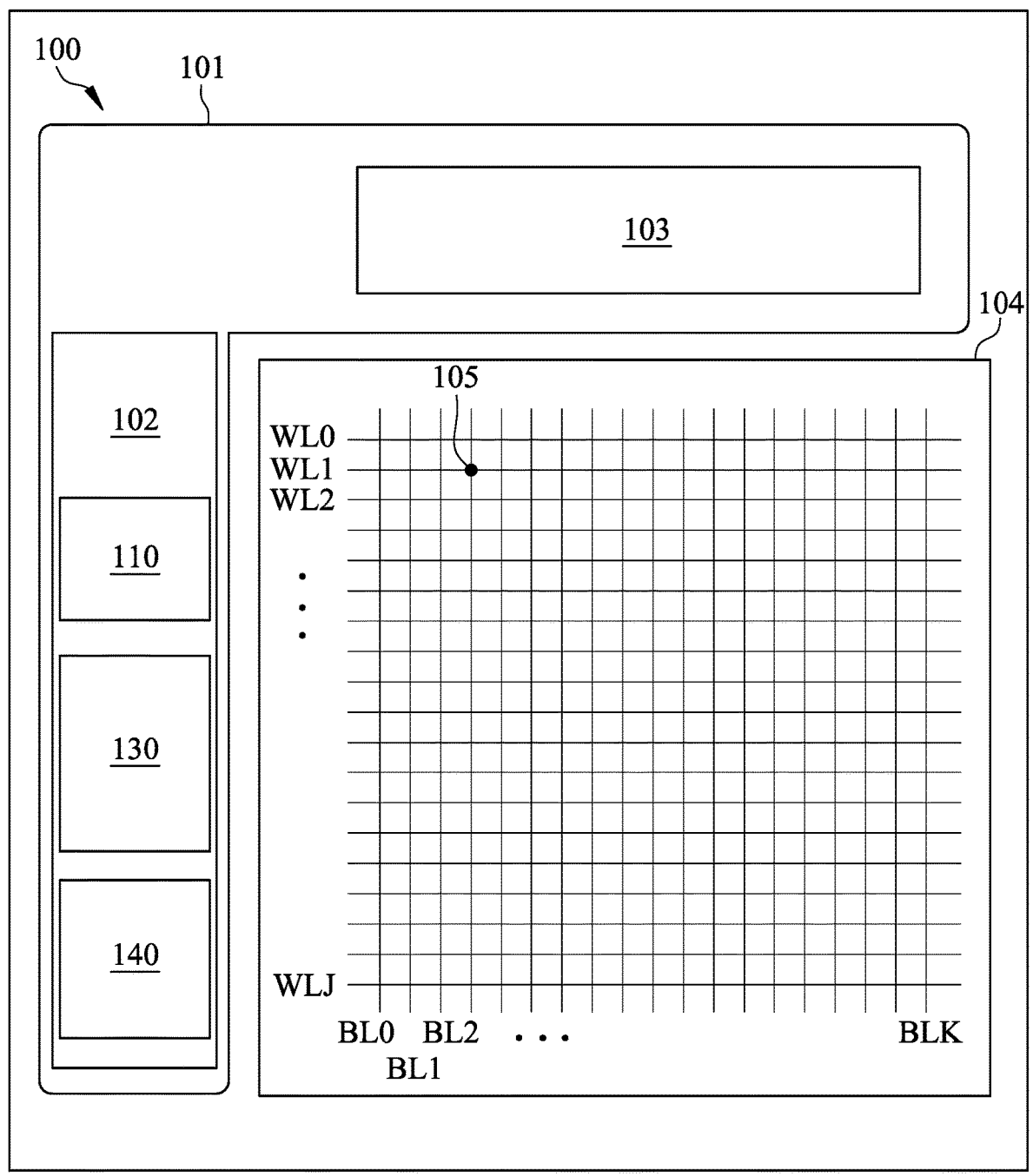
FIG. 1 is a schematic diagram of a memory device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Reference is now made to FIG. 1. FIG. 1 is a schematic diagram of a memory device 100, in accordance with some embodiments. For illustration, the memory device 100 includes a memory controller 101 and a memory array 104. The memory array 104 is configured to store data and the memory controller 101 is coupled to the memory array 104 and configured to control operations of the memory array 104, for example, writing data to or reading data from the memory array 104.

In some embodiments, the memory array 104 is embodied as a semiconductor memory device. The memory array 104 includes word lines WL (e.g., WL0, WL1 . . . . WLJ) and bit lines BL (e.g., BL0, BL1 . . . . BLK). Each one of the word lines WL extends in a first direction (e.g., X-direction) and each one of the bit lines BL extends in a second direction (e.g., Y-direction). The word lines WL and the bit lines BL may be conductive metals or conductive lines. The memory array 104 includes a plurality of memory cells 105 arranged in two or three dimensional arrays. In some embodiments, each memory cell 105 is coupled to a corresponding word line WL and a corresponding bit line BL, and can be operated according to voltages or currents through the corresponding word line WL and the corresponding bit line BL. In some embodiments, each bit line includes bit lines BL, BLB coupled to one or more memory cells 105 of a group of memory cells 105 disposed along the second direction (e.g., Y-direction). The bit lines BL, BLB may receive and/or provide differential signals. Each memory cell 105 may include a volatile memory, a non-volatile memory, or a combination of them. In some embodiments, each memory cell 105 is embodied as a static random access memory (SRAM) cell. In some embodiments, the memory array 104 includes additional lines (e.g., select lines, reference lines, reference control lines, power rails, etc.).

In some embodiments, the memory controller 101 is configured to write data to or read data from the memory array 104 according to electrical signals through word lines WL and bit lines BL. In some embodiments, the memory controller 101 includes a word line controller 102 and a bit line controller 103. The word line controller 102 and the bit line controller 103 may be embodied as logic circuits, analog circuits, or a combination of them. In one configuration, the word line controller 102 is a circuit that provides a voltage or current through one or more word lines WL of the memory array 104, and the bit line controller 103 is a circuit that provides or senses a voltage or current through one or more bit lines BL of the memory array 104. The word line controller 102 may be coupled to word lines WL of the memory array 104, and the bit line controller 103 may be coupled to bit lines BL of the memory array 104. In some embodiments, the memory controller 101 includes more, fewer, or different components than shown in FIG. 1.

As shown in FIG. 1, the word line controller 102 includes a word line driver 110, a suppressing circuit 130, and a control signal generator 140. These components may operate together to generate a voltage to apply to a word line WL coupled to a selected memory cell 105. In some embodiments, the word line controller 102 includes more, fewer, or different components than shown in FIG. 1. In some embodiments, the word line controller 102 includes multiples of the word line driver 110, the suppressing circuit 130, and/or the control signal generator 140.

The word line driver 110 is a circuit or a component that receives a voltage input or an input pulse, and generates an output voltage or an output pulse, according to the voltage input or the input pulse. The word line driver 110 may be coupled to one or more word lines WL. The word line driver 110 may be embodied as an amplifier circuit or any driver circuit. The word line driver 110 can generate different voltage outputs or pulses having different voltage amplitudes for different operations. For example, the word line driver 110 may apply different voltage outputs for performing a read operation, performing a write operation, etc. The word line driver 110 may apply the voltage output or the pulse to one or more memory cells 105 through a word line WL coupled to the one or more memory cells 105.

The suppressing circuit 130 is a circuit or a component that selectively reduces a voltage output of the word line driver 110. The suppressing circuit 130 may be coupled to an output of the word line driver 110. The suppressing circuit 130 can reduce the voltage output of the word line driver 110 in response to the voltage output of the word line driver 110 exceeding a threshold value. In response to the voltage output of the word line driver 110 not exceeding the threshold value, the suppressing circuit 130 can bypass or omit reducing the voltage output of the word line driver 110.

The control signal generator 140 is a circuit or a component that generates an enable signal or a pulse to control timing of operation of the suppressing circuit 130. In some embodiments, the control signal generator 140 generates a pulse that enables the suppressing circuit 130 for a brief time period to selectively reduce the voltage output of the word line driver 110.

The memory device 100 depicted in FIG. 1 is given for illustrative purposes. Various implements of the memory device 100 are within the contemplated scope of the present disclosure. For example, in some embodiments, the memory device 100 includes more, fewer, or different components than shown in FIG. 1.

Figure 2:
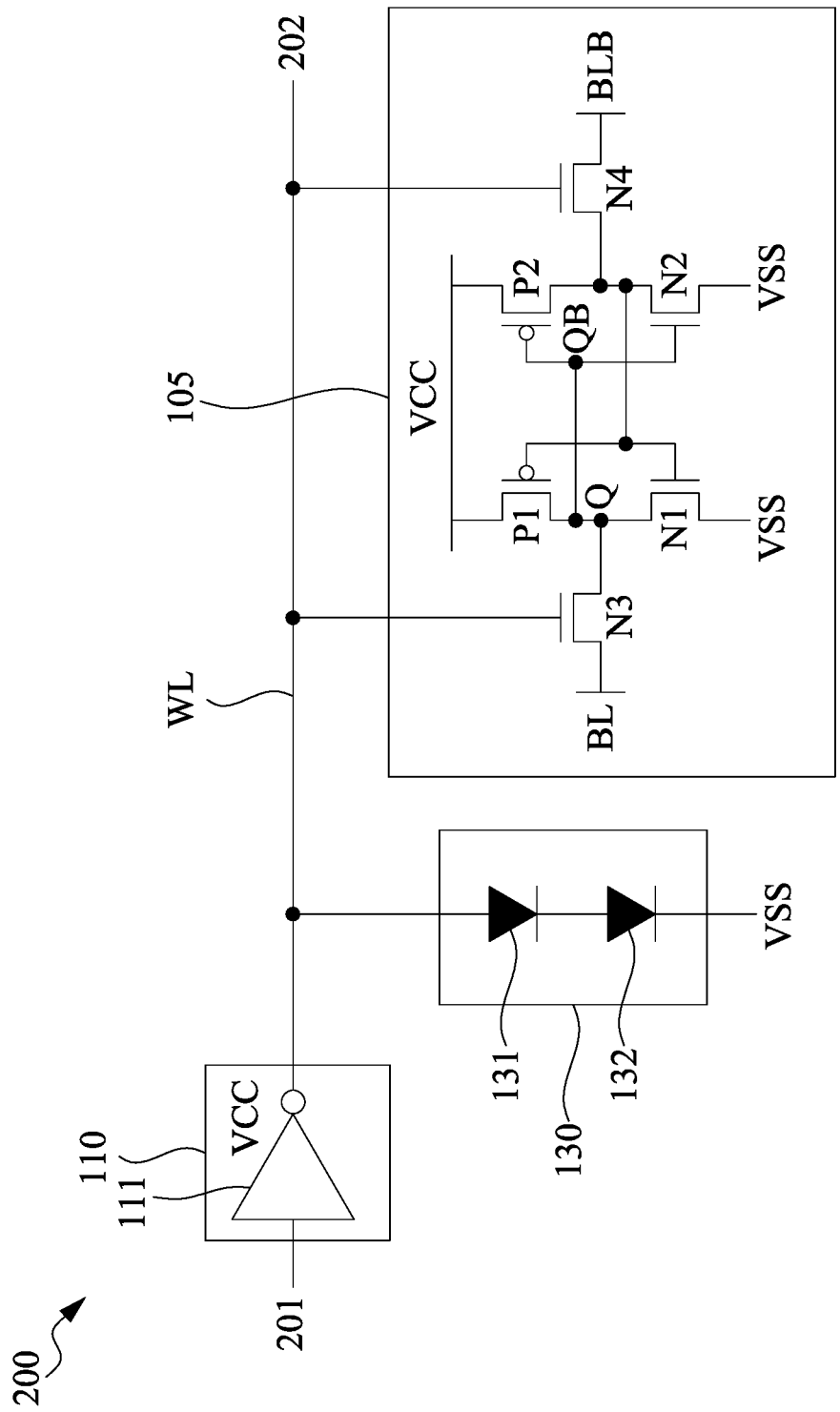
FIG. 2 is a schematic diagram of a part of a memory device, in accordance with some embodiments.

Reference is now made to FIG. 2. FIG. 2 is a schematic diagram of part of a memory device 200 configured with respect to the memory device 100 of FIG. 1, in accordance with some embodiments. With respect to the embodiments of FIG. 1, like elements in FIG. 2 are designated with the same reference numbers for ease of understanding. The specific operations of similar elements, which are already discussed in detail in above paragraphs, are omitted herein for the sake of brevity.

As shown in FIG. 2, the memory device 200 includes a memory cell 105, a word line driver 110 and a suppressing circuit 130. In some embodiments, the memory cell 105 includes N-type transistors N1, N2, N3, N4 and P-type transistors P1, P2. The N-type transistors N1, N2, N3 and N4 include N-type metal-oxide-semiconductor field-effect transistors (MOSFET). N-type fin field-effect transistors (FinFET) or other suitable N-type transistors. The P-type transistors P1 and P2 include P-type MOSFET, P-type FinFET or other suitable P-type transistors. These components may operate together to store data. In other embodiments, the memory cell 105 includes more, fewer, or different components than shown in FIG. 2.

In one configuration, the N-type transistors N3, N4 include gate electrodes coupled to a word line WL. In one configuration, a drain electrode of the N-type transistor N3 is coupled to a bit line BL, and a source electrode of the N-type transistor N3 is coupled to a port Q. In one configuration, a drain electrode of the N-type transistor N4 is coupled to a bit line BLB, and a source electrode of the N-type transistor N4 is coupled to a port QB. In some embodiments, the N-type transistors N3, N4 operate as electrical switches. The transistors N3, N4 may allow the bit line BL to electrically couple to or decouple from the port Q and allow the bit line BLB to electrically couple to or decouple from the port QB, according to a voltage applied to the word line WL. For example, according to a supply voltage VCC corresponding to a high state (or logic value '1') applied to the word line WL, the N-type transistor N3 is enabled to electrically couple the bit line BL to the port Q and the N-type transistor N4 is enabled to electrically couple the bit line BLB to the port QB. For another example, according to a supply voltage VSS corresponding to a low state (or logic value '0') applied to the word line WL, the N-type transistor N3 is disabled to electrically decouple the bit line BL from the port Q and the N-type transistor N4 is disabled to electrically decouple the bit line BLB from the port QB.

In one configuration, the N-type transistor N1 includes a source electrode coupled to a first supply voltage rail supplying the supply voltage VSS, a gate electrode coupled to the port QB, and a drain electrode coupled to the port Q. In one configuration, the P-type transistor P1 includes a source electrode coupled to a second supply voltage rail supplying the supply voltage VCC, a gate electrode coupled to the port QB, and a drain electrode coupled to the port Q. In one configuration, the N-type transistor N2 includes a source electrode coupled to the first supply voltage rail supplying the supply voltage VSS, a gate electrode coupled to the port Q. and a drain electrode coupled to the port QB. In one configuration, the P-type transistor P2 includes a source electrode coupled to the second supply voltage rail supplying the supply voltage VCC, a gate electrode coupled to the port Q, and a drain electrode coupled to the port QB. In this configuration, the N-type transistor N1 and the P-type transistor P1 operate as an inverter, and the N-type transistor N2 and the P-type transistor P2 operate as an inverter, such that two inverters form cross-coupled inverters. In some embodiments, the cross-coupled inverters may sense and amplify a difference in voltages at the ports Q. QB. When writing data, the cross-coupled inverters may sense voltages at the ports Q. QB provided through the transistors N3, N4 and amplify a difference in voltages at the bit lines BL, BLB. For example, the cross-coupled inverters sense a voltage 0.4 V at the port Q and a voltage 0.5V at the port QB, and amplify a difference in the voltages at the ports Q. QB through a positive feedback (or a regenerative feedback) such that the voltage at the port Q becomes the supply voltage VSS (e.g., 0V) and the voltage at the port QB becomes the supply voltage VCC (e.g. 1V).

The amplified voltages at the ports Q. QB may be provided to the bit lines BL, BLB through the transistors N3, N4, respectively for reading. In one approach, the bit lines BL, BLB can be charged to a supply voltage (e.g., 1V), while the transistors N3, N4 are disabled. After pre-charging the bit lines BLB, BLB, the transistors N3, N4 can be enabled to discharge the bit lines BL, BLB, according to the programmed states or voltages at the ports Q. QB. According to the programmed states or voltage at the ports Q, QB, a voltage of one of the bit lines BL, BLB may be changed or reduced, while a voltage of the other one of the bit lines BL, BLB may remain unchanged. For example, if the memory cell 105 is programmed such that the voltage at the port Q is the supply voltage VSS (e.g., 0V) and the voltage at the port QB is the supply voltage VCC (e.g. 1V), enabling the transistors N3, N4 causes the voltage at the bit line BL to drop while the voltage at the bit line BLB to remain unchanged. By sensing or detecting a voltage difference of the bit lines BL, BLB, a bit stored by the memory cell 105 can be determined.

As depicted in FIG. 2, the word line driver 110 is coupled to the memory cell 105 through a word line WL. In some embodiments, the word line driver 110 includes an inverter 111 with the supply voltage VCC. The word line driver 110 can receive a voltage input 201 and generate a voltage output 202 in the word line WL. The word line driver 110 may apply the voltage output 202 to the memory cell 105 through the word line WL. In one configuration, the suppressing circuit 130 is coupled to the word line WL. The suppressing circuit 130 can selectively adjust or reduce the voltage output 202 to protect the memory cell 105 or prevent a bit flip.

Figure 3:
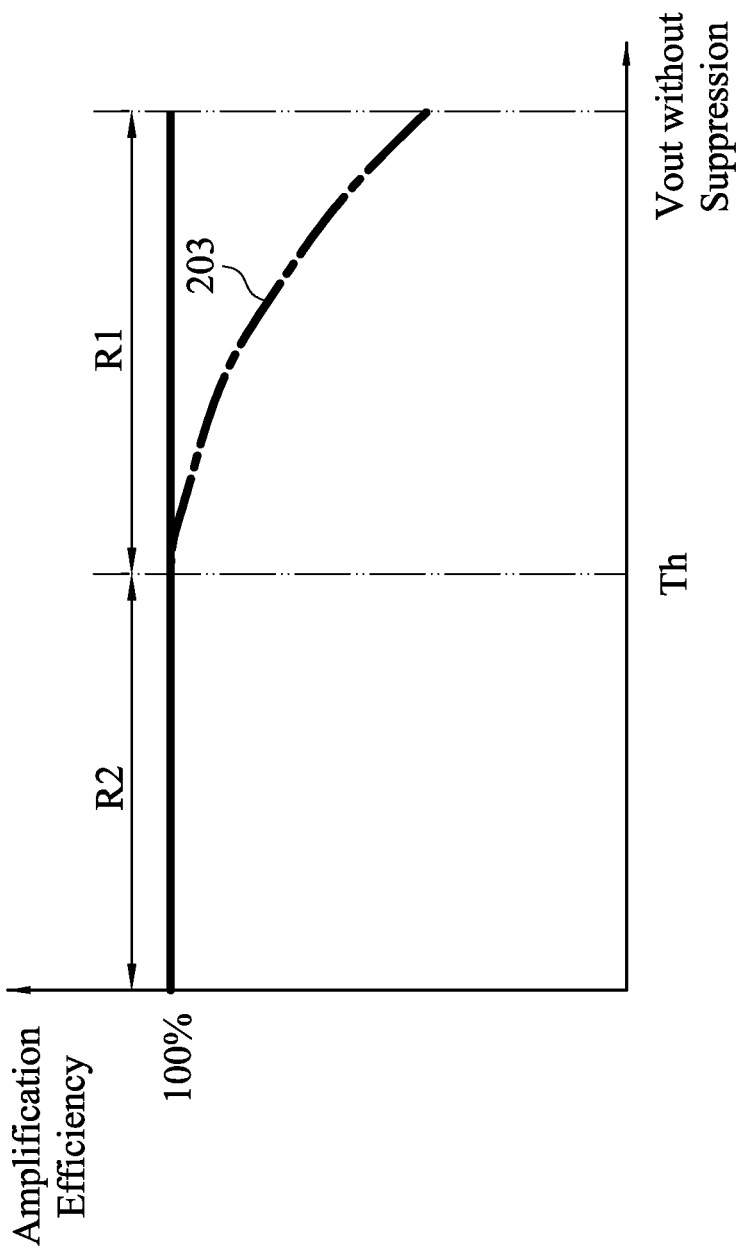
FIG. 3 is a graph showing change in suppression applied by the suppressing circuit for different ranges of voltage output of the word line driver, in accordance with some embodiments.

Reference is now made to FIG. 3. FIG. 3 is a graph showing change in suppression applied by the suppressing circuit 130 of FIG. 2 for different ranges of voltage output 202 of the word line driver 110, in accordance with some embodiments. A plot 203 corresponds to the voltage output 202. The horizontal axis of the graph of FIG. 3 corresponds to voltage value. The vertical axis of the graph of FIG. 3 corresponds to an amplification efficiency of the word line driver 110.

In some embodiments, the suppressing circuit 130 can selectively reduce a voltage output 202 of the word line driver 110 as shown in a plot 203. For example, the suppressing circuit 130 reduces the voltage output 202 of the word line driver 110 for a voltage range R1 above a threshold value Th to obviate a bit flip. For example, the suppressing circuit 130 can bypass or omit reducing the voltage output of the word line driver 116 for the voltage range R2 of the voltage output 202 of the word line driver 110 below the threshold voltage Th, such that the operating speed of the memory device 100 may not be degraded.

With the reference to FIGS. 2-3. In some embodiments, the suppressing circuit 130 includes two diodes connected in series and coupled between the word line WL and the supply voltage rail of the supply voltage VSS. In some embodiments, the suppressing circuit 130 can help improve a stability of operation of the memory device 200 without lowering an operating speed (or reading speed) of the memory device 200. In some embodiments, the suppressing circuit 130 is configured to reduce the voltage output 202 of the word line driver 110 for a first voltage range of the voltage output 202 above a threshold value. Meanwhile, the suppressing circuit 130 may not reduce the voltage output 202 for a second voltage range below the threshold value to avoid slowing down the operating speed (or reading speed) of the memory device 200. Accordingly, the stability of the memory device 200 can be improved by reducing the voltage output 202 of the word line driver 110 in the first voltage range. Moreover, an operating speed of the memory device 200 may not be compromised by not reducing the voltage output 202 of the word line driver 116 in the second range.

The memory device 200 depicted in FIG. 2 is given for illustrative purposes. Various implements of the memory device 200 are within the contemplated scope of the present disclosure. For example, in some embodiments, the memory cell 105 is a SRAM cell with more than six transistors, for example, an 8 transistors (8T) SRAM.

The graph depicted in FIG. 3 is given for illustrative purposes and is not intended for limiting the present disclosure. For example, in some embodiments, the plot 203 is smaller than 100% in the voltage range R2.

Figure 4B:
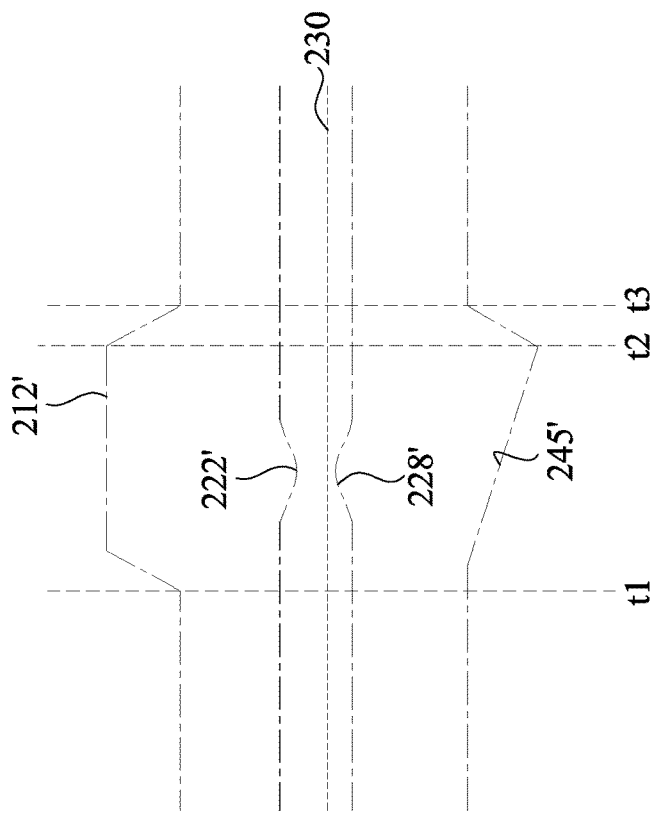
FIG. 4B is a timing diagram showing an operation of a memory device, in accordance with some embodiments.
Figure 4A:
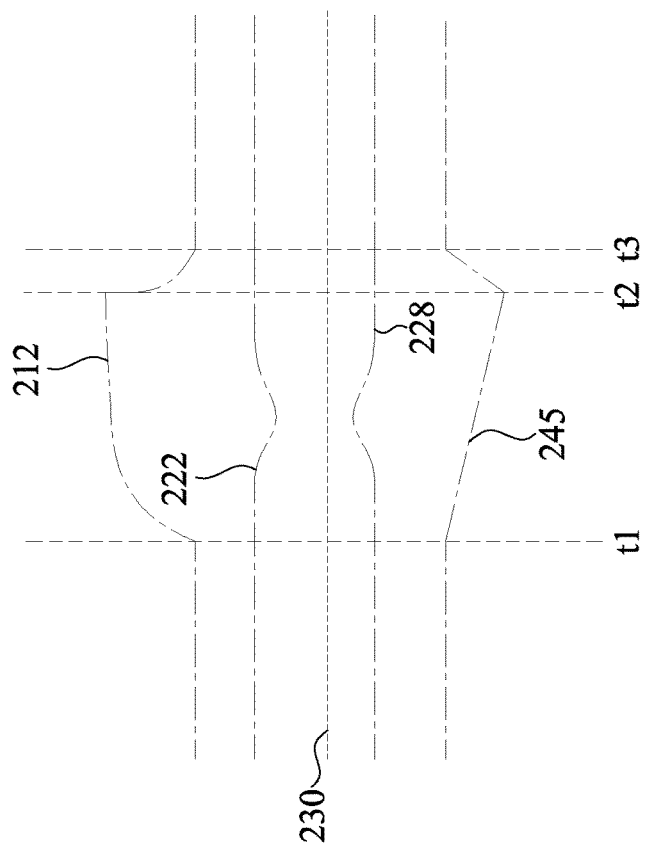
FIG. 4A is a timing diagram showing an operation of a memory device, in accordance with some embodiments.

Reference is now made to FIG. 4A. FIG. 4A is a timing diagram showing an operation of the memory device 200 of FIG. 2 for the voltage range R1 of FIG. 3, in accordance with some embodiments. The timing diagram of FIG. 4A includes a plot 212 for the voltage output 202 with the suppressing circuit 130. The timing diagram of FIG. 4A also includes a plot 222 for the voltage at the port QB with the suppressing circuit 130. The timing diagram of FIG. 4A also includes a plot 228 for the voltage at the port Q with the suppressing circuit 130. The timing diagram of FIG. 4A also includes a plot 245 for the voltage at the bit line BL with the suppressing circuit 130.

In one example shown in FIG. 4A, the memory cell 105 is programmed such that the port Q has a low voltage (e.g., supply voltage VSS) and the port QB has a high voltage (e.g., supply voltage VCC). Before time t1, voltages of the bit lines BL, BLB can be pre-charged to the high voltage by the bit line controller 103. Before time t1, the voltage output 202 of the word line driver 110 has the low voltage, such that the transistors N3, N4 may be disabled. By disabling the transistors N3, N4, the bit line BL can be electrically decoupled from the port Q, and the bit line BLB can be electrically decoupled from the port QB.

From time t1 to time t3, the word line driver 110 can generate a voltage sufficient to enable the transistors N3, N4. Specifically, the word line driver 110 increases the voltage output 202 from time t1 to time t2 and reduces the voltage output 202 to be the supply voltage VSS from time t2 to time t3. By enabling the transistors N3, N4, the bit line BL can be electrically coupled to the port Q, and the bit line BLB can be electrically coupled to the port QB. Because the voltage of the port QB is the high voltage before time t1, the voltage of the bit line BLB may remain unchanged from time t1 to time t3. However, because the voltage of the port Q is the low voltage before time t1, the voltage at the bit line BL can decrease from time t1 to time t2. Based on the difference in the voltage of the bit line BL and the voltage of the bit line BLB, data stored by the memory cell 105 can be determined.

After time t3, the voltage output 202 is the supply voltage VSS, such that the transistors N3, N4 may be disabled. By disabling the transistors N3, N4, the bit line BL can be electrically decoupled from the port Q, and the bit line BLB can be electrically decoupled from the port QB. After time t3, voltages of the bit lines BL. BLB can be pre-charged to the high voltage by the bit line controller 103.

With the configurations of the present application, the suppressing circuit 130 can suppress the voltage output 202 to prevent a bit flip. For example, as shown in the plot 212, the suppressing circuit 130 can suppress or reduce the voltage output 202. By reducing or suppressing the voltage output 202, the voltages at the ports Q. QB may not cross a flipping point 230 as shown in the plots 222, 228, such that a bit flip may not occur. In some embodiments, reducing the voltage output 202 with the suppressing circuit 130 as shown in the plot 245 may cause the voltage at the bit line BL to be reduced by a less amount or by a lower rate compared to the voltage at the bit line BL without the suppressing circuit 130 as shown in the plot 242. Despite the reduced voltage difference at the bit lines BL, BLB due to the suppression, the high voltage output 202 from the word line driver 110 may be sufficient to ensure sufficient voltage separation between the bit lines BL, BLB in the period from time t1.

Reference is now made to FIG. 4B. FIG. 4B illustrates a timing diagram showing an operation of the memory device 200 of FIG. 2 for the voltage range R2 of FIG. 3, in accordance with some embodiments. The timing diagram of FIG. 4B includes a plot 212' for the voltage output 202 of the word line driver 110 with the suppressing circuit 130. The timing diagram of FIG. 4B also includes a plot 222' for the voltage at the port QB with the suppressing circuit 130. The timing diagram of FIG. 4B also includes a plot 228' for the voltage at the port Q with the suppressing circuit 130. The timing diagram of FIG. 4B also includes a plot 245' for the voltage at the bit line BL with the suppressing circuit 130. In some embodiments, the operation of the memory device 200 for the voltage range R2 is similar to the operation of the memory device 200 for the voltage range R1 described above with respect to FIG. 4A, except that the suppressing circuit 130 may not reduce or suppress the voltage output 202.

The timing diagrams depicted in FIG. 4A and FIG. 4B are given for illustrative purposes and are not intended for limiting the present disclosure. In another example, the memory cell 105 is programmed such that the port Q has a high voltage like the supply voltage VCC and the port QB has a low voltage like the supply voltage VSS (i.e., the plot 222 has a low voltage and the plot 228 has a high voltage before time t1).

Figure 5:
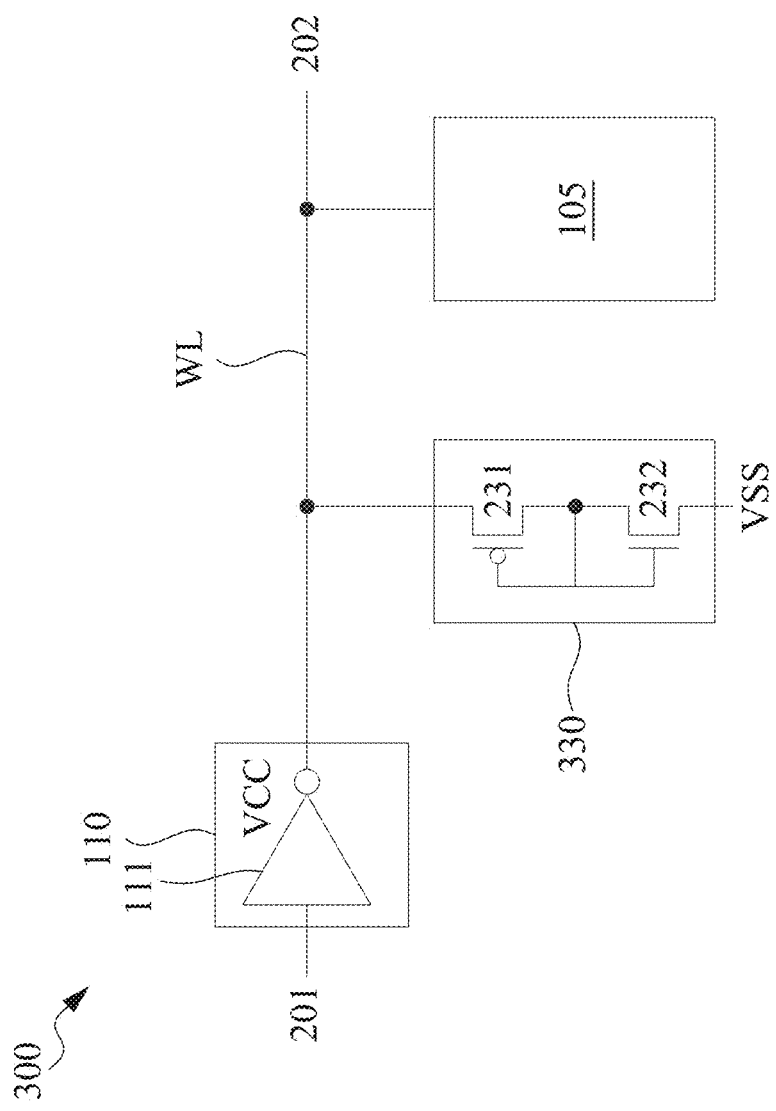
FIG. 5 is a schematic diagram of a memory device, in accordance with some embodiments.

Reference is now made to FIG. 5. FIG. 5 is a schematic diagram of a memory device 300 configured with respect to the memory device 200 of FIG. 2, in accordance with some embodiments. With respect to the embodiments of FIGS. 1-3, 4A and 4B, like elements in FIG. 5 are designated with the same reference numbers for ease of understanding.

Compared with the memory device 200 of FIG. 2, the diodes 131 and 132 in the suppressing circuit 130 of the memory device 300 of FIG. 3 are implemented with two transistors 231 and 232 respectively. For clarity, the suppressing circuit 130 of the memory device 300 of FIG. 3 is hereinafter referred to as a suppressing circuit 330. As shown in FIG. 5, the suppressing circuit 330 includes the transistor 231 and transistor 232 that are connected in series. In some embodiments, the two transistors 231 and 232 are of different conductive types. In some embodiments, the transistor 231 is a p-type transistor and the transistor 232 is an n-type transistor, a first source/drain electrode of the transistor 231 is coupled to the word line WL, a first source/drain electrode of the transistor 232 is coupled to the supply voltage rail of the supply voltage VSS, and second source/drain electrodes of the transistors 231 and 232 and gate electrodes of the transistors 231 and 232 are coupled together.

In some embodiments, the suppressing circuit 330 is of a complementary FET (CFET) structure referred to as an integrated circuit structure including an active semiconductor device (i.e., with source/drain structure implements with active regions, gate structures, metal-on-device MD on the active regions, front side metal routing, etc.) on its front side and some metal routing on its backside. In some embodiments, the active semiconductor device on the front side of the suppressing circuit 330 is formed on a substrate (not shown) in a front side process. After the front side process is complete, the suppressing circuit 330 is flipped upside down, such that a backside surface of the substrate faces upwards. The substrate is further thinned down and removed. In some embodiments, thinning is accomplished by a CMP process, a grinding process, or the like. Accordingly, backside process is performed to form structures on the backside of the suppressing circuit 330.

The memory device 300 depicted in FIG. 5 is given for illustrative purposes. Various implements of the memory device 300 are within the contemplated scope of the present disclosure. For example, in some embodiments, the suppressing circuit 330 includes more transistors than shown in FIG. 5.

Figure 6:
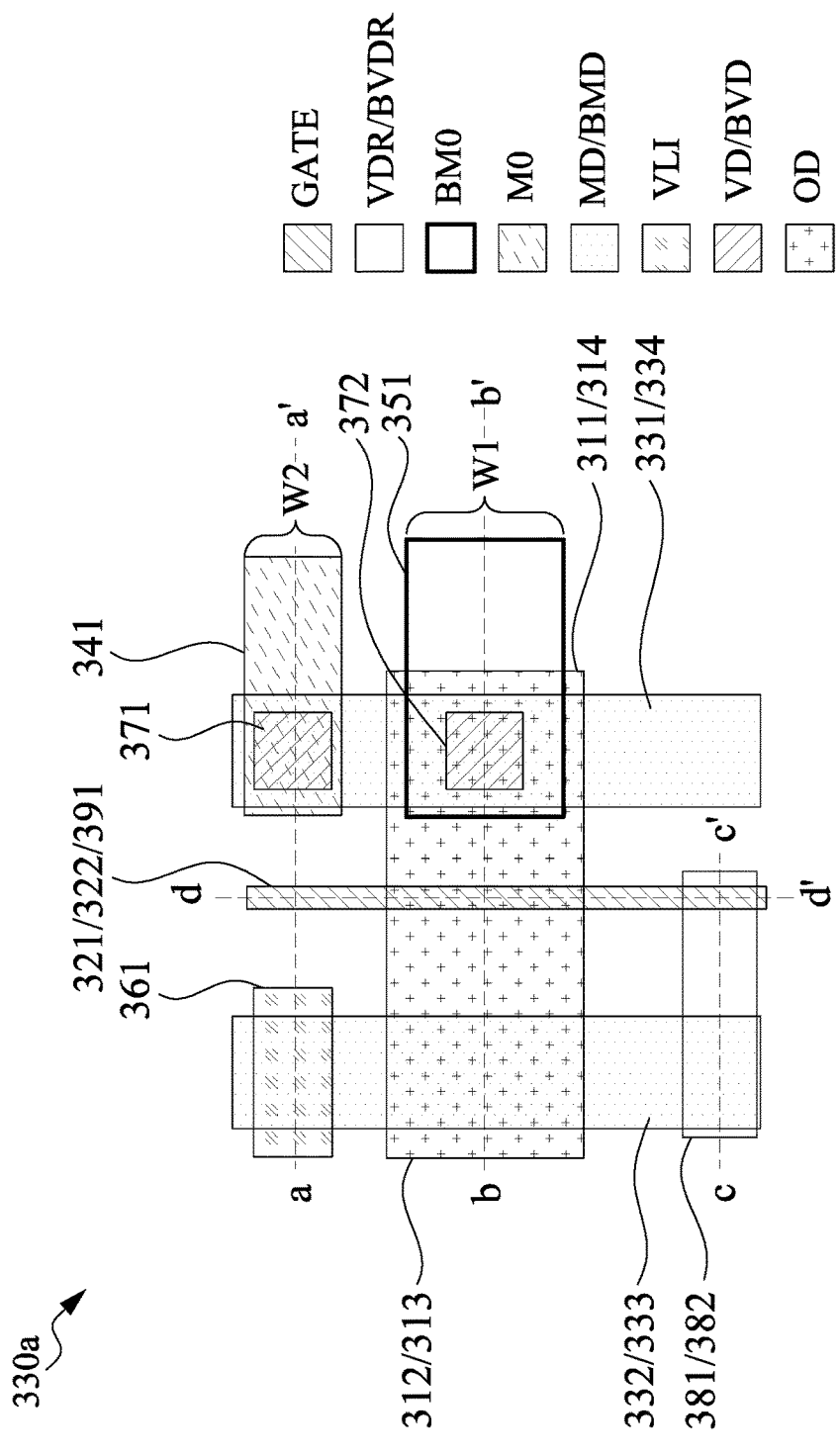
FIG. 6 is a diagram of a layout of a suppressing circuit in a plan view, in accordance with some embodiments.

Reference is now made to FIG. 6. FIG. 6 is a diagram of a layout 330a of the suppressing circuit 330 of FIG. 5 in a plan view, in accordance with some embodiments. With respect to the embodiments of FIG. 1-5, like elements in the embodiments of FIG. 6 are designated with the same reference numbers for ease of understanding.

For illustration, the suppressing circuit 330 with the layout 330a includes active regions (i.e., oxide-diffusion, OD) 311-314, gates 321, 322, conductive segments (i.e., metal on oxide-definition areas, MD) 331, 332 on the front side of the suppressing circuit 330, conductive segments 333, 334 (symbolized as "BMD") on the backside of the suppressing circuit 330, a conductive line 341 of a front side metal zero layer (M0), a conductive line 351 of a backside metal zero layer (BM0), a conductive structures 361 (symbolized as "VLI"), a via 371 (symbolized as "VD") on the front side of the suppressing circuit 330, a via 372 (symbolized as "BVD") on the backside of the suppressing circuit 330, a conductive structure 381 (symbolized as "VDR") on the front side of the suppressing circuit 330, a conductive structures 382 (symbolized as "BVDR") on the backside of the suppressing circuit 330 and an insulating layer 391. In some embodiments, the conductive lines of BM0 (e.g., the conductive line 351) has a width W1 and the conductive lines of M0 (e.g., the conductive line 341) has a width W2 smaller than the width W1.

In some embodiments, the gates 321, 322 and the conductive segments 331-334 extend along a direction y. The active regions 311 and 312 are arranged on first and second sides of the gate 321 along a direction x perpendicular to the direction y respectively. In some embodiments, the active regions 311, 312 are of p-type and the active regions 313, 314 are of n-type. In some embodiments, the active regions 311, 312, the gates 321 and the conductive segments 331, 332 together correspond to the transistor 231 of FIG. 5. Similarly, the active regions 313 and 314 are arranged on first and second sides of the gate 322 along the direction x respectively. The active regions 313, 314, the gates 322 and the conductive segments 333, 334 together correspond to the transistor 232 of FIG. 5. As show in FIG. 6, the active region 311 overlaps the active region 314, the active region 312 overlaps the active region 313, the conductive segment 331 overlaps the conductive segment 334, the conductive segment 332 overlaps the conductive segment 333 and the gate 321 overlaps the gate 322 and the insulating layer 391 in the layout 330a. In some embodiments, the structures of transistors 231 and 232 overlap with each other in the layout 330a.

Figure 7:
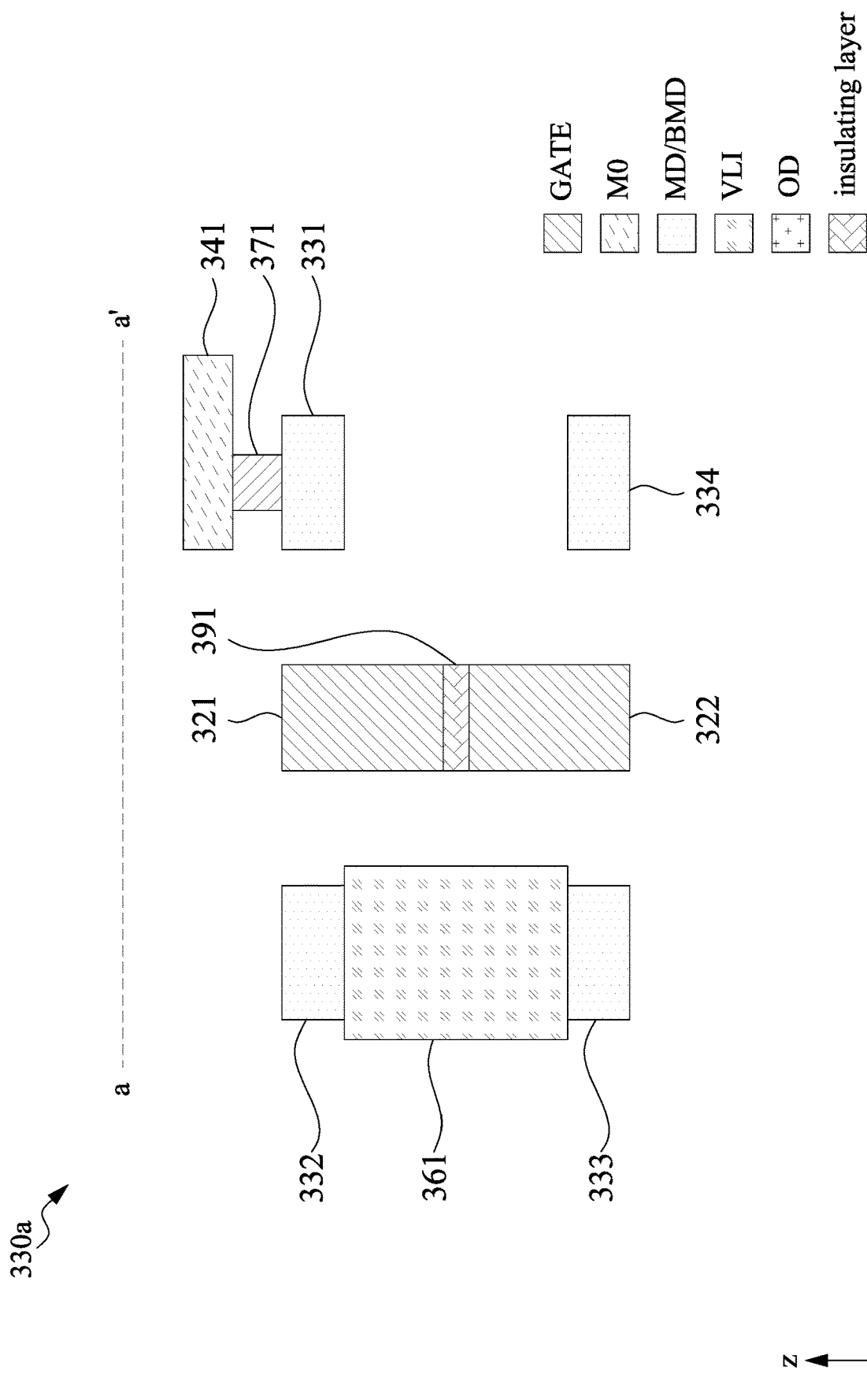
FIG. 7 is a cross-sectional view of a suppressing circuit 330, in accordance with various embodiments.

Reference is now made to FIG. 7. FIG. 7 is a cross-sectional view of the suppressing circuit 330 with the layout 330a, taken along the line a-a' of FIG. 6, in accordance with various embodiments. As shown in FIG. 7, the conductive segment 331 is above the conductive segment 334 along a direction z perpendicular to the directions x and y. The conductive line 341 is disposed in the front side metal zero layer above the conductive segment 331 and is coupled to the conductive segment 331 through the via 371 disposed between the conductive line 341 and the conductive segment 331. The gate 321 is above the gate 322 and is insulated from the gate 322 by the insulating layer 391 disposed between the gates 321 and 322. The conductive segment 332 is above the conductive segment 333. The conductive structure 361 extends along the direction z and couples the conductive segment 332 to the conductive segment 333.

Figure 8:
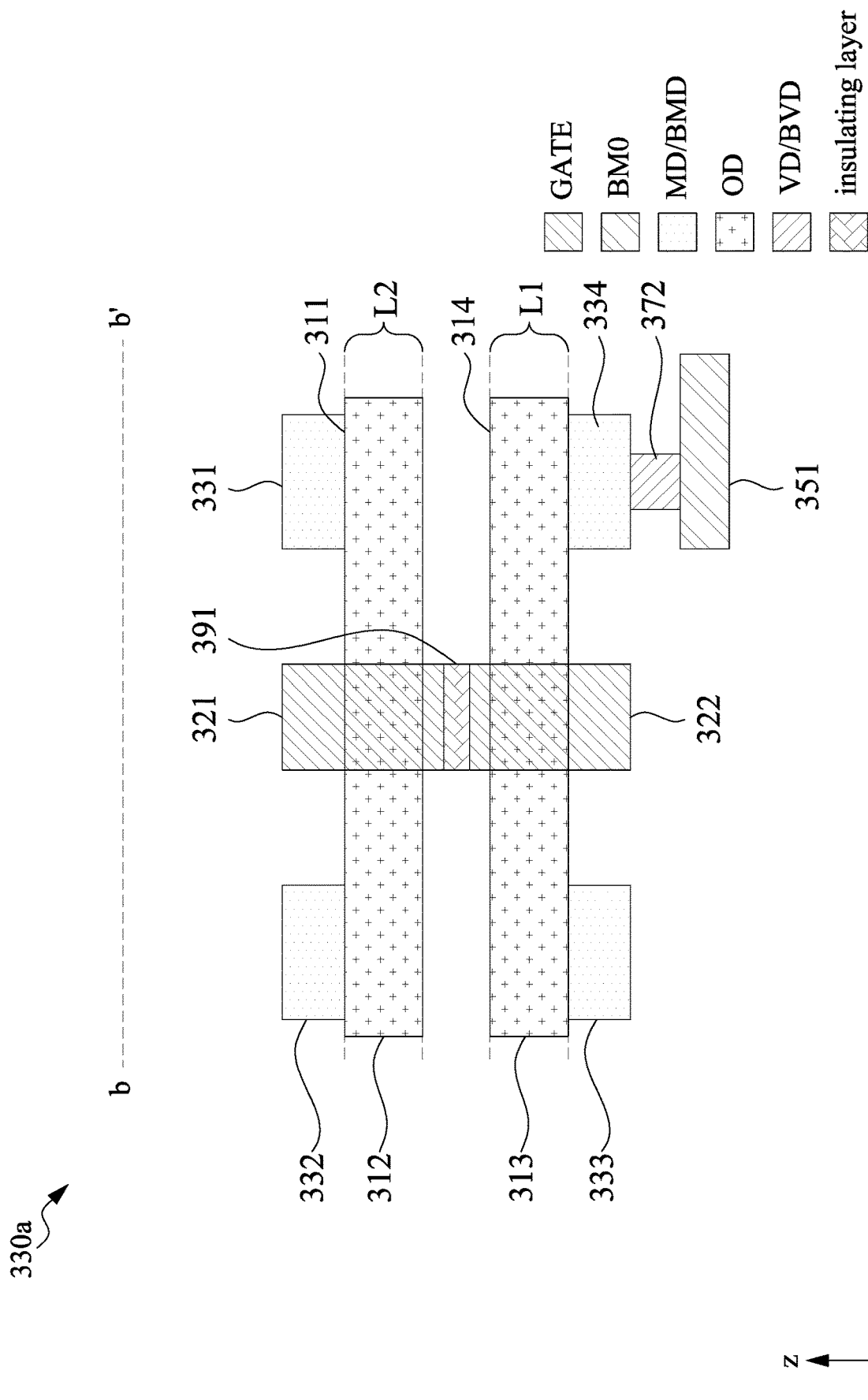
FIG. 8 is a cross-sectional view of a suppressing circuit 330, in accordance with various embodiments.

Reference is now made to FIG. 8. FIG. 8 is a cross-sectional view of the suppressing circuit 330 with the layout 330a, taken along the line b-b' of FIG. 6, in accordance with various embodiments. As shown in FIG. 8, the active region 311 is connected to the gate 321 at a first side of the gate 321 along the direction x and the active region 312 is connected to the gate 321 at a second side of the gate 321 along the direction x. Similarly, the active region 314 is connected to the gate 322 at a first side of the gate 322 along the direction x and the active region 313 is connected to the gate 322 at a second side of the gate 322 along the direction x. The active region 311 is disposed below the conductive segment 331 and is coupled thereto. The active region 314 is disposed below the active region 311 and is coupled to the conductive segment 334 below the active region 314. The conductive line 351 is disposed in the backside metal zero layer below the conductive segment 334. The via 372 is disposed between the conductive segment 334 and the conductive line 351 and couples the conductive segment 334 to the conductive line 351. The active region 312 is disposed below the conductive segment 332 and is coupled thereto. The active region 313 is disposed below the active region 312 and is coupled to the conductive segments 333 below the active region 313.

In some embodiments, as shown in FIG. 8, the active regions 313 and 314 are disposed in a layer L1 and the active regions 311 and 312 are disposed in a layer L2 above the layer L1. In some embodiments, the conductive structure 361 in FIG. 7 extends along the direction z from the layer L1 to the layer L2.

Figure 9:
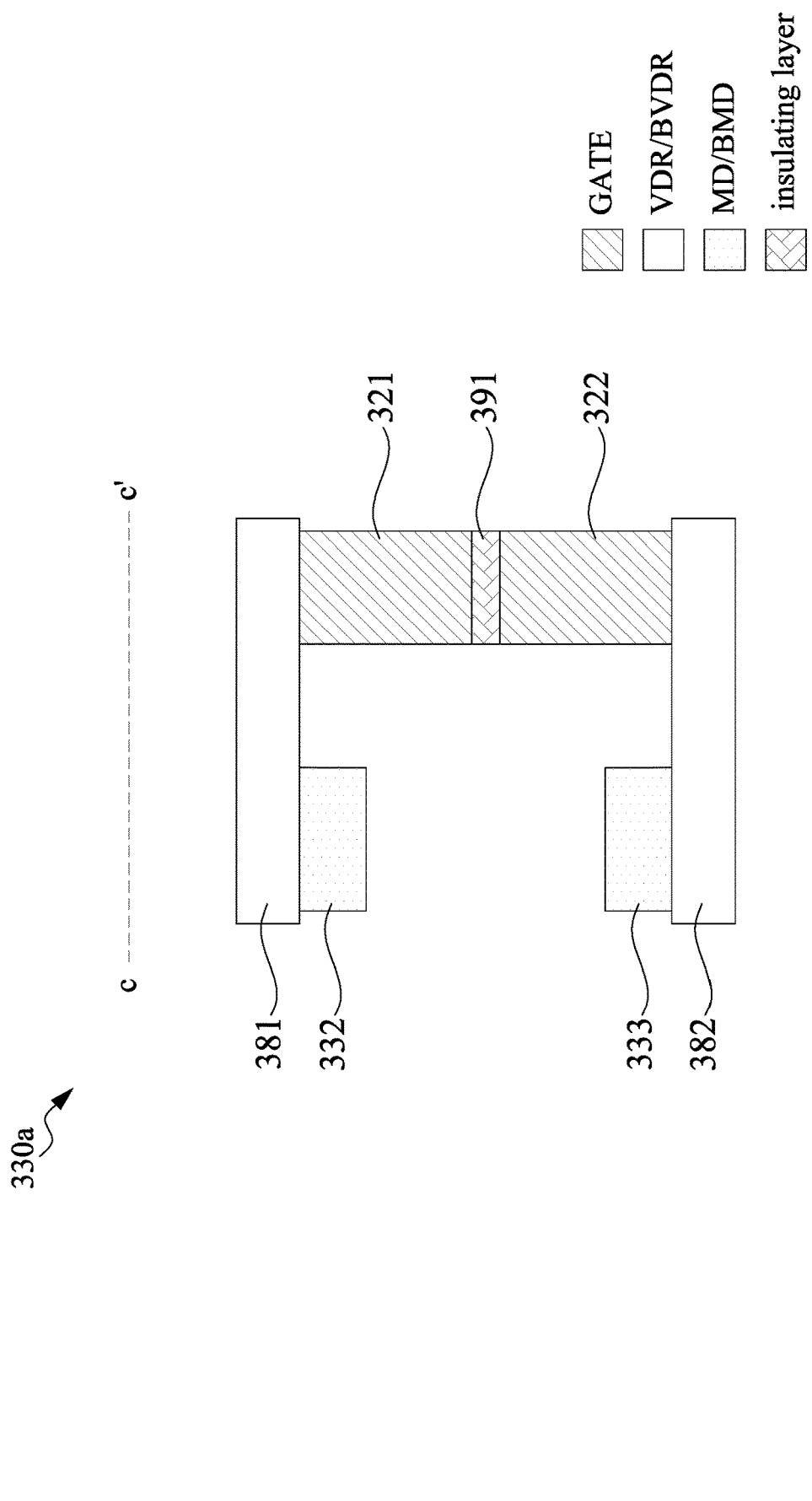
FIG. 9 is a cross-sectional view of a suppressing circuit 330, in accordance with various embodiments.

Reference is now made to FIG. 9. FIG. 9 is a cross-sectional view of the suppressing circuit 330 with the layout 330a, taken along the line c-c' of FIG. 6, in accordance with various embodiments. As shown in FIG. 9, the conductive structure 381 is disposed above the gate 321 and the conductive segment 332. The conductive structure 381 couples the gate 321 to the conductive segment 332. The conductive structure 382 is disposed below the gate 322 and the conductive segment 333. The conductive structure 382 couples the gate 322 to the conductive segment 333.

Figure 10:
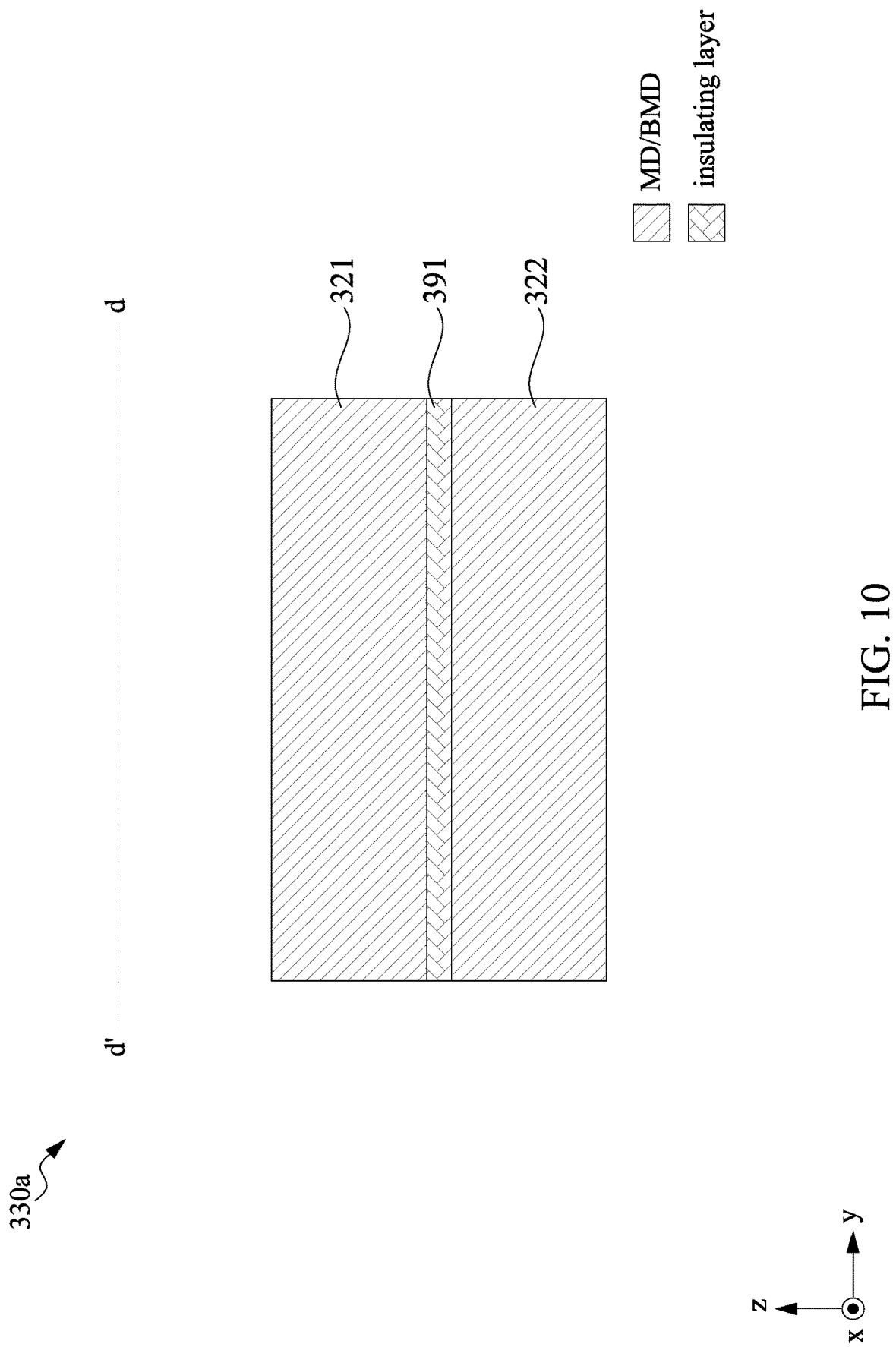
FIG. 10 is a cross-sectional view of a suppressing circuit 330, in accordance with various embodiments.

Reference is now made to FIG. 10. FIG. 10 is a cross-sectional view of the suppressing circuit 330 with the layout 330a, taken along the line d-d' of FIG. 6, in accordance with various embodiments. As shown in FIG. 10, the insulating layer extends along the direction y. The insulating layer 391 is between the gates 321 and 322 and the insulating layer 391 is connected to the gates 321 and 322.

Reference is now made to FIGS. 5-10. In some embodiments, the word line WL of the memory device 300 in FIG. 5 is a power rail disposed at the front side and the conductive line 341 is coupled to the power rail. In other embodiments, the word line WL of the memory device 300 in FIG. 5 is implemented as the conductive line 341. The conductive line 341 and the via 371 transmits the voltage output 202 on the word line WL to the transistor 231 embodied as the structure including the active regions 311, 312, the gate 321, the conductive segments 331, 332 and the conductive structure 381. In some embodiments, the conductive line 351 is coupled to the supply voltage rail of the supply voltage VSS disposed at the backside. In other embodiments, the supply voltage rail of the supply voltage VSS of the memory device 300 in FIG. 5 is implemented as the conductive line 351. The supply voltage VSS is applied, through the conductive line 351 and the via 372, to the transistor 231 embodied as the structure including the active regions 311, 312, the gate 321, the conductive segments 331, 332 and the conductive structure 381.

In some embodiments, the active regions 311, 312, the gates 321 and the conductive segments 331, 332 together correspond to the transistor 232 of FIG. 5, and the active regions 313, 314, the gates 322 and the conductive segments 333, 334 together correspond to the transistor 231 of FIG. 5, the conductive line 341 is coupled to the supply voltage rail of the supply voltage VSS and the conductive line 351 is coupled to the word line WL.

The suppressing circuit 330 with the layout 300a depicted in FIGS. 6-10 is given for illustrative purposes. Various implements of the suppressing circuit 330 are within the contemplated scope of the present disclosure. For example, in some embodiments, the suppressing circuit 330 does not include the insulating layer 391. In some embodiments, the gates 321 and 322 are connected together as one gate structure.

Figure 11:
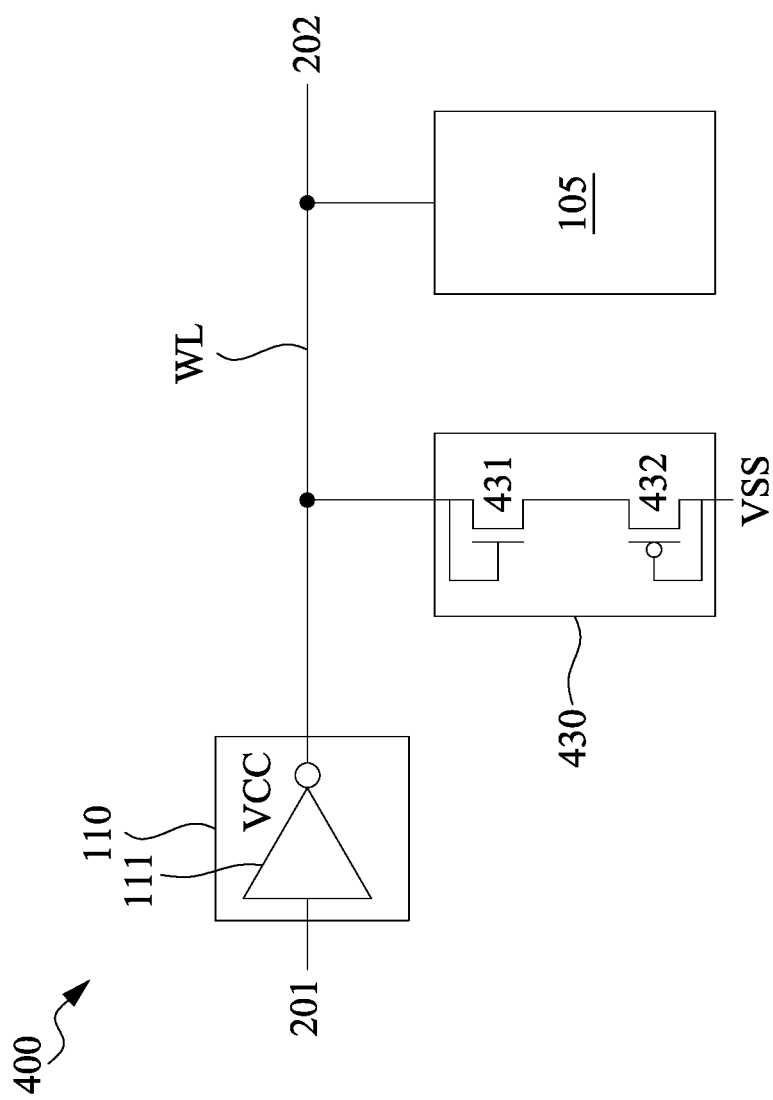
FIG. 11 is a schematic diagram of a memory device, in accordance with some embodiments.

Reference is now made to FIG. 11. FIG. 11 is a schematic diagram of a memory device 400 configured with respect to the memory device 300 of FIG. 5, in accordance with some embodiments. With respect to the embodiments of FIGS. 1-10, like elements in FIG. 11 are designated with the same reference numbers for ease of understanding.

Compared with the memory device 300 of FIG. 5, instead of having the suppressing circuit 330 including the transistors 231 and 232 being p-type and n-type transistors respectively, the memory device 400 of FIG. 11 has a suppressing circuit 430 including transistors 431 and 432 being n-type and p-type transistors respectively in series. As shown in FIG. 11, A first source/drain electrode and a gate electrode of the transistor 431 are coupled to the word line WL, a first source/drain electrode and a gate electrode of the transistor 432 are coupled to the supply voltage rail of the supply voltage VSS, and second source/drain electrodes of the transistors 431 and 432 are coupled to each other. In some embodiments, the suppressing circuit 430 is embodied as the CFET structure described above in the paragraph corresponding to FIG. 5.

The memory device 400 depicted in FIG. 11 is given for illustrative purposes. Various implements of the memory device 300 are within the contemplated scope of the present disclosure. For example, in some embodiments, the suppressing circuit 430 includes more transistors than shown in FIG. 11.

Figure 12:
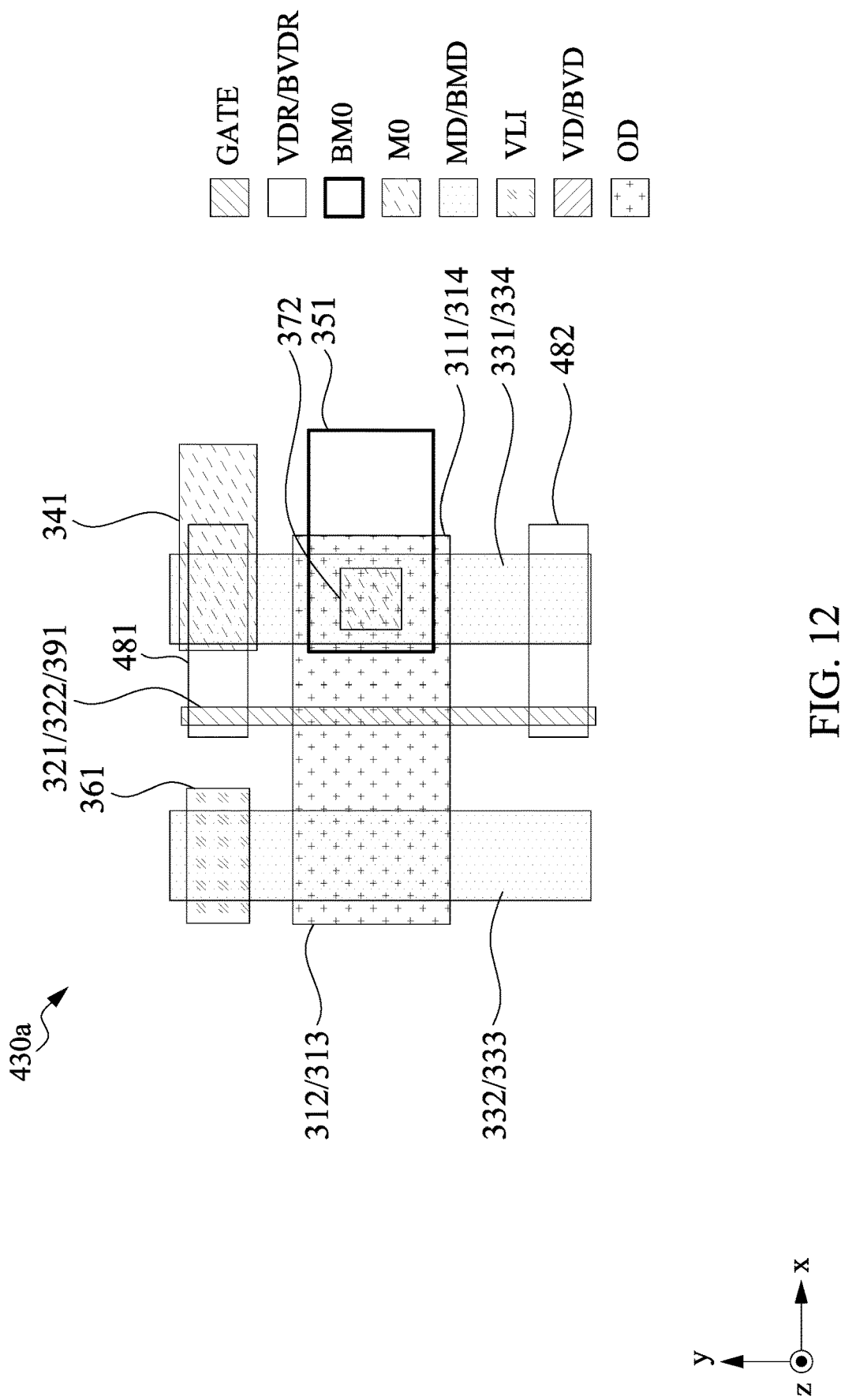
FIG. 12 is a diagram of a layout of a suppressing circuit in a plan view, in accordance with some embodiments.

Reference is now made to FIG. 12. FIG. 12 is a diagram of a layout 430a of the suppressing circuit 430 of FIG. 11 in a plan view, in accordance with some embodiments. With respect to the embodiments of FIGS. 1-11, like elements in the embodiments of FIG. 12 are designated with the same reference numbers for ease of understanding.

Compared with the suppressing circuit 330 with the layout 330a in FIG. 6, the suppressing circuit 430 with the layout 430a in FIG. 12 includes conductive structures 481 and 482 instead of having the conductive structures 381 and 382. The conductive structure 481 is disposed under the conductive line 341 and above the gate 321 and conductive segment 331. The conductive structure 481 couples the gate 321, the conductive segment 331 and the conductive line 341 together. The conductive structure 482 is disposed under the gate 322 and conductive segment 334 and couples the gate 322 to the conductive segment 334. In some embodiments, the active regions 311, 312 of the suppressing circuit 430 with the layout 430a in FIG. 12 are of n-type, and the active regions 313, 314 of the suppressing circuit 430 with the layout 430a in FIG. 12 are of p-type.

In some embodiments, the active regions 311 and 312 are of n-type and the active regions 313, 314 are of p-type. In some embodiments, the active regions 311 and 312, the conductive segments 331, 332, the gate 321 together correspond to the transistor 431, and the active regions 313 and 314, the conductive segments 333, 334, the gate 322 together correspond to the transistor 432.

The memory device 400 with the layout 430a depicted in FIG. 12 is given for illustrative purposes. Various implements of the memory device 400 are within the contemplated scope of the present disclosure. For example, in some embodiments, the suppressing circuit 430 includes more transistors than shown in FIG. 11.

Figure 13:
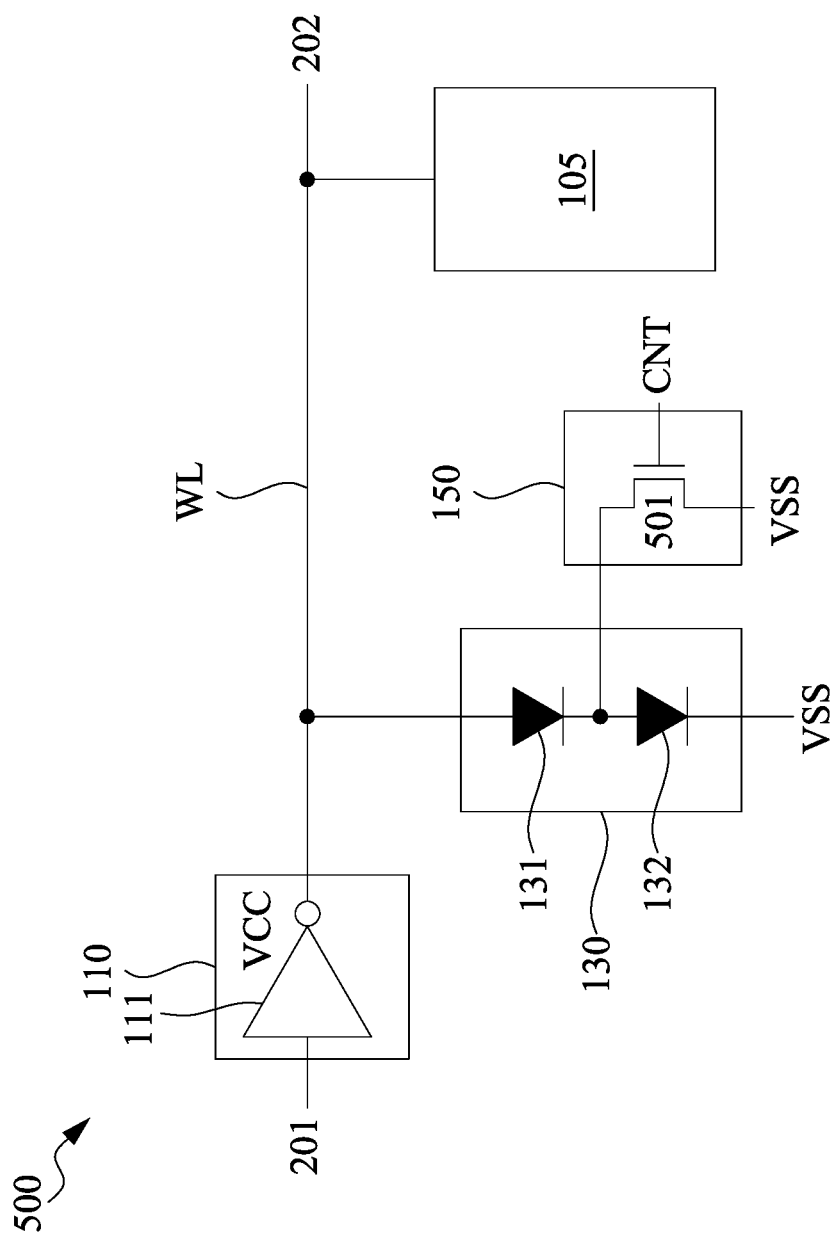
FIG. 13 is a schematic diagram of a memory device, in accordance with some embodiments.

Reference is now made to FIG. 13. FIG. 13 is a schematic diagram of a memory device 500 configured with respect to the memory device 200 of FIG. 2, in accordance with some embodiments. With respect to the embodiments of FIGS. 1-12, like elements in FIG. 13 are designated with the same reference numbers for ease of understanding. Compared with the memory device 200 of FIG. 2, the memory device 500 of FIG. 13 further includes a control circuit 150. The control circuit 150 is configured to reset or discharge the node between the diodes 131 and 132.

In some embodiments, the control circuit 150 includes a transistor 501. In some embodiments, the transistor 501 is implemented as an n-type transistor. In one configuration, the transistor 501 includes a drain electrode coupled to the node between the diodes 131, 132, a source electrode coupled to a supply voltage rail to receive the supply voltage VSS, and a gate electrode to receive a control signal CNT. The control signal CNT may be the voltage input 201 of the word line driver 110 or a separate control signal generated by the control signal generator 140. In some embodiments, the control signal CNT may have a high state (or 1V) when the voltage output 202 of the word line driver 110 has a low state (e.g., 0V). In addition, the control signal CNT may have a low state (or 0V) when the voltage output 202 of the word line driver 110 has a high state (e.g., 0.5-1.2V). Accordingly, when the voltage output 202 of the word line driver 110 has the low state (e.g., 0V), the transistor 501 can be enabled (turn on) to electrically couple the node between the diodes 131, 132 to the supply voltage rail providing the supply voltage VSS to discharge the node. When the voltage output 202 of the word line driver 110 has the high state (e.g., 0.5-1.2V), the transistor 501 can be disabled (turn off) to electrically decouple the node between the diodes 131, 132 from the supply voltage rail to not discharge the node. By discharging the node between the diodes 131, 132 through the transistor 501, the suppressing circuit 130 can operate in a reliable manner.

The memory device 500 depicted in FIG. 13 is given for illustrative purposes. Various implements of the memory device 500 are within the contemplated scope of the present disclosure. For example, in some embodiments, the transistor 501 is a p-type transistor.

Figure 14:
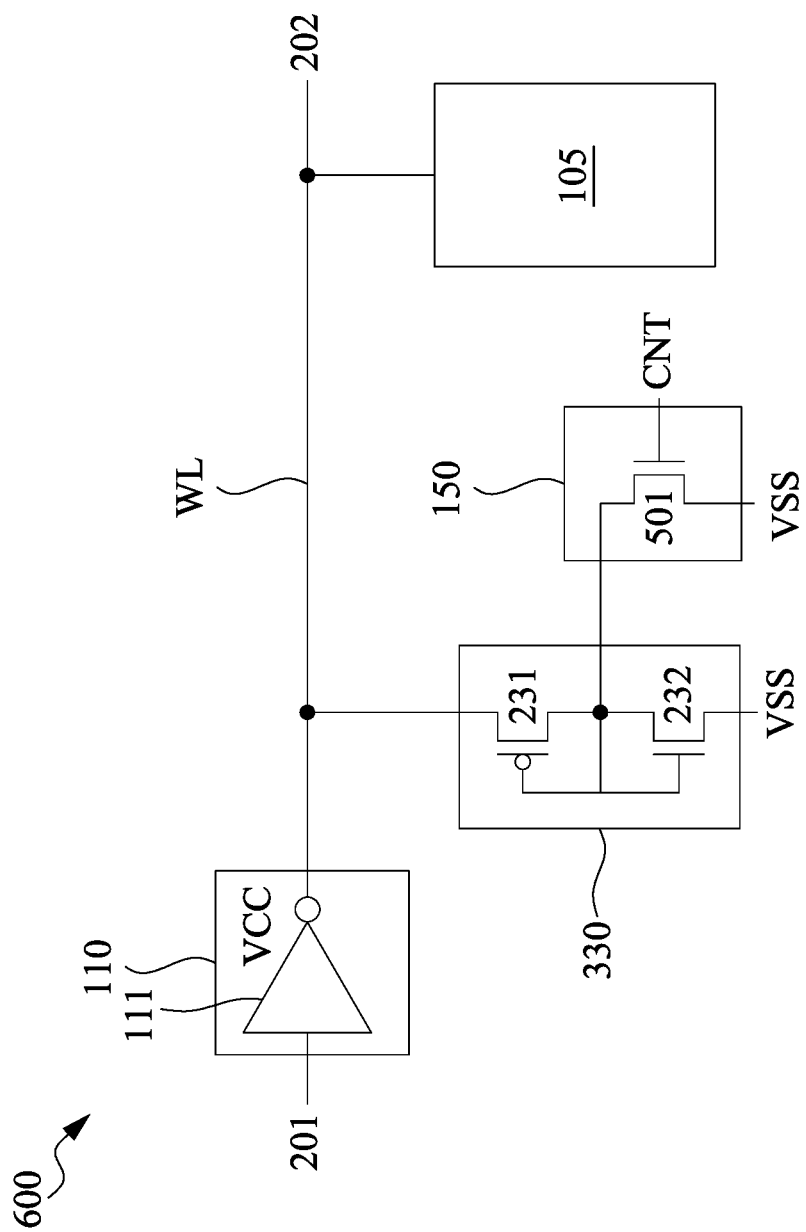
FIG. 14 is a schematic diagram of a memory device, in accordance with some embodiments.

Reference is now made to FIG. 14. FIG. 14 is a schematic diagram of a memory device 600 configured with respect to the memory device 300 of FIG. 5, in accordance with some embodiments. With respect to the embodiments of FIGS. 1-13, like elements in FIG. 14 are designated with the same reference numbers for ease of understanding. Compared with the memory device 300 of FIG. 5, the memory device 600 further includes the control circuit 150 as described above in the paragraph corresponding to FIG. 13 and the drain electrode of the transistor 501 is coupled to the node between the transistors 231 and 232.

The memory device 600 depicted in FIG. 14 is given for illustrative purposes. Various implements of the memory device 600 are within the contemplated scope of the present disclosure. For example, in some embodiments, the transistor 501 is a p-type transistor.

Figure 15:
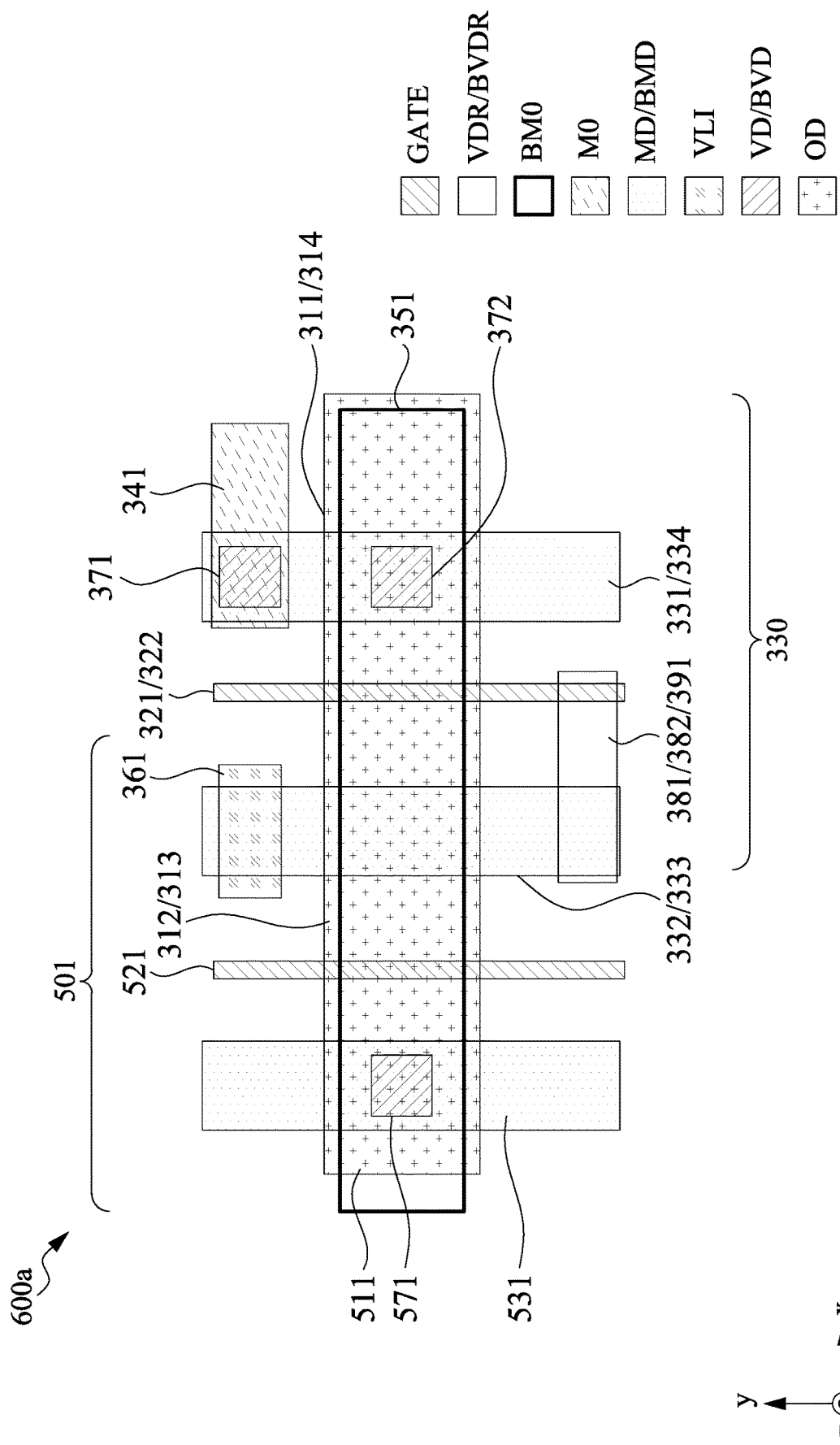
FIG. 15 is a diagram of a layout of part of a memory device in a plan view, in accordance with some embodiments.

Reference is now made to FIG. 15. FIG. 15 is a diagram of a layout 600a of part of the memory device 600 corresponding to the suppressing circuit 330 and the transistor 501 of FIG. 14 in a plan view, in accordance with some embodiments. The suppressing circuit 330 of the part of the memory device 600 with the layout 600a in FIG. 15 is configured with respected to the suppressing circuit 330 with the layout 330a in FIG. 6. With respect to the embodiments of FIGS. 1-14, like elements in the embodiments of FIG. 15 are designated with the same reference numbers for ease of understanding. The specific operations of similar elements, which are already discussed in detail in above paragraphs, are omitted herein for the sake of brevity.

In addition to elements like the active region 311 included in the suppressing circuit 330, the part of the memory device 600 with the layout 600a further includes an active region 511, a gate 521, a conductive segment 531 and a via 571. In some embodiments, the active regions 313, 511, the gate 521 and the conductive segments 333, 531 together correspond to transistor 501. As shown in FIG. 15, the gate 521 extends along the direction y and is connected to the active regions 313, 511. The active regions 313, 511 are disposed at a first side and a second side of the gate 521 along the direction x respectively. The conductive segment 531 is disposed below the active region 511 and is coupled to the active region 511. The via 571 is disposed below the conductive segment 531 and above the conductive line 351. The via 571 couples the conductive line 351 to the conductive segment 531 to provide the supply voltage VSS to the structure operating as the transistor 501.

The memory device 600 with the layout 600a depicted in FIG. 15 is given for illustrative purposes. Various implements of the memory device 600 with the layout 600a are within the contemplated scope of the present disclosure. For example, in some embodiments, the memory device 600 with the layout 600a does not include the insulating layer 391.

Figure 16:
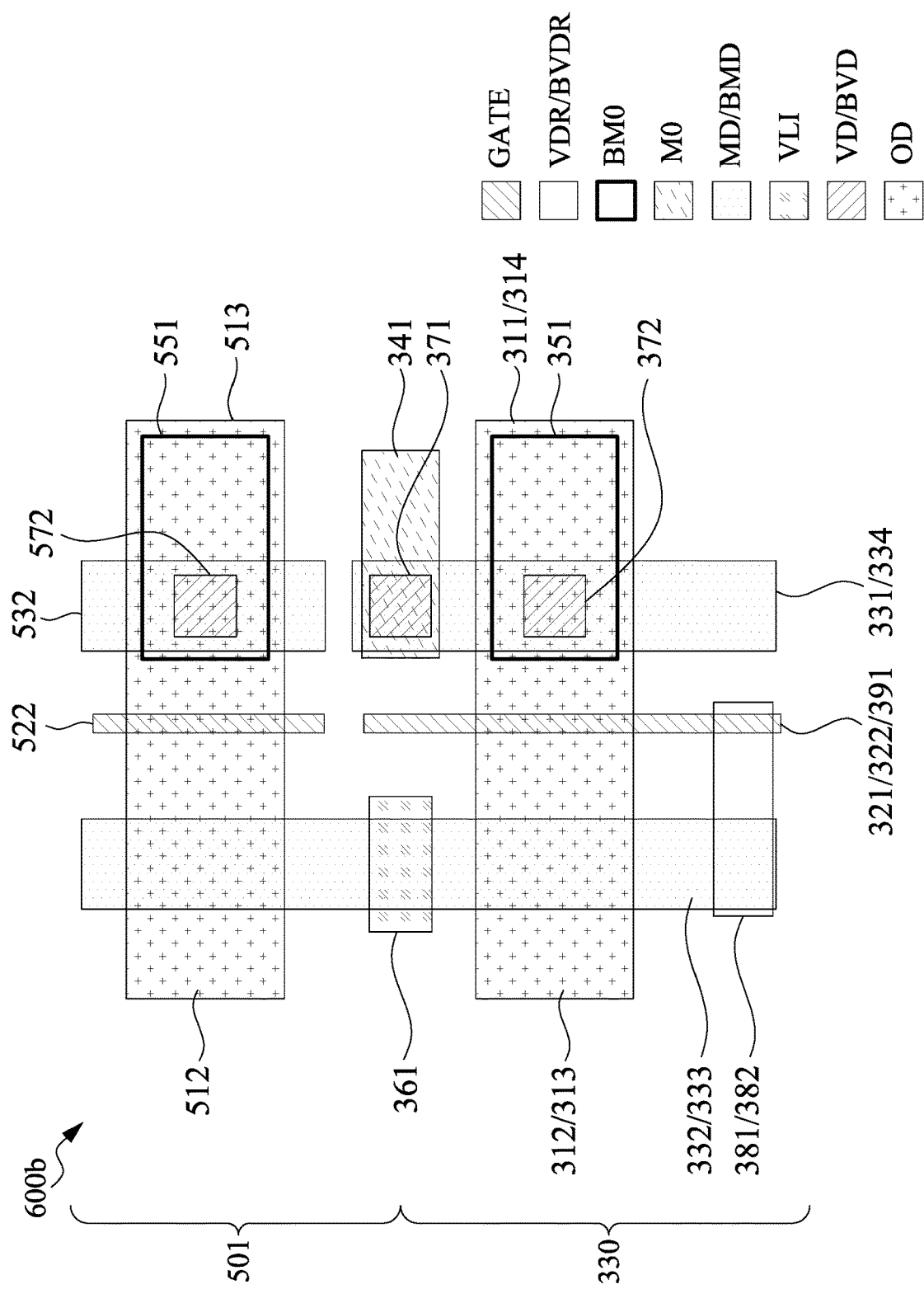
FIG. 16 is a diagram of a layout of part of a memory device in a plan view, in accordance with some embodiments.

Reference is now made to FIG. 16. FIG. 16 is a diagram of a layout 600b of part of the memory device 600 corresponding to the suppressing circuit 330 and the transistor 501 of FIG. 14 in a plan view, in accordance with some embodiments. The suppressing circuit 330 of the part of the memory device 600 with the layout 600b in FIG. 16 is configured with respected to the suppressing circuit 330 with the layout 330a in FIG. 6 With respect to the embodiments of FIGS. 1-15, like elements in the embodiments of FIG. 16 are designated with the same reference numbers for ease of understanding. The specific operations of similar elements, which are already discussed in detail in above paragraphs, are omitted herein for the sake of brevity.

As shown in FIG. 16, in addition to elements like the active region 311 included in the suppressing circuit 330, the part of the memory device 600 with the layout 600b further includes active regions 512, 513, a gate 522, a conductive segment 532, a via 572 and a conductive line 551. In some embodiments, the active regions 512, 513, the gate 522, the conductive segments 333, 532 together correspond to the transistor 501 in FIG. 14. The gate 522 extends along the direction y and separated from the gate 322 along the direction y. The active regions 512, 513 is disposed at first and second sides of the gate 522 along the direction x. The active region 512 is disposed above the conductive segment 333 and coupled to the conductive segment 333. Similarly, the active region 513 is disposed above the conductive segment 532 and coupled to the conductive segment 532. The via 572 is disposed below the conductive segment 532 and above the conductive line 551 that is coupled to the supply voltage rail of the supply voltage VSS. The via 572 couples the conductive line 551 to the conductive segment 531 to provide the supply voltage VSS to the structure operating as the transistor 501.

The memory device 600 with the layout 600b depicted in FIG. 16 is given for illustrative purposes. Various implements of the memory device 600 with the layout 600b are within the contemplated scope of the present disclosure. For example, in some embodiments, the memory device 600 with the layout 600b does not include the insulating layer 391.

Figure 17:
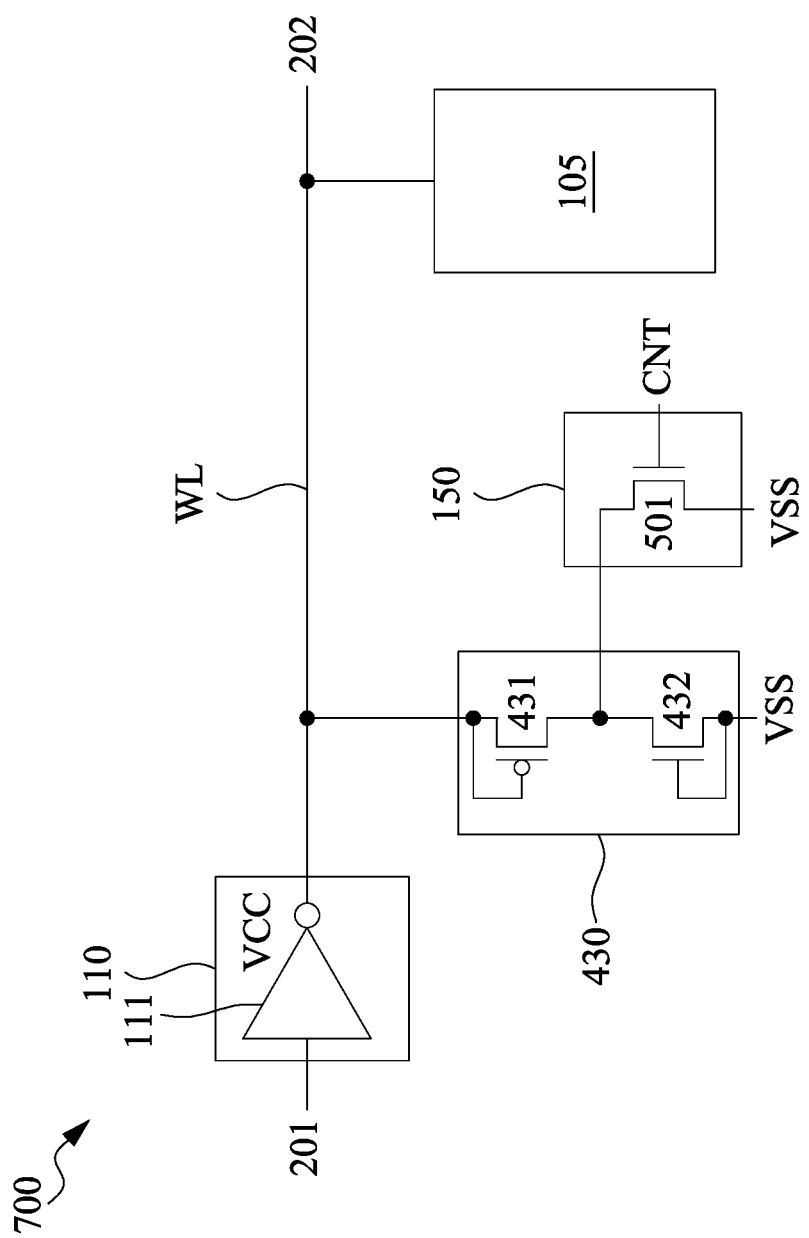
FIG. 17 is a schematic diagram of a memory device, in accordance with some embodiments.

Reference is now made to FIG. 17. FIG. 17 is a schematic diagram of a memory device 700 configured with respect to the memory device 400 of FIG. 11, in accordance with some embodiments. With respect to the embodiments of FIGS. 1-16, like elements in FIG. 17 are designated with the same reference numbers for ease of understanding. Compared with the memory device 400 of FIG. 11, the memory device 400 further includes the control circuit 150 as described above in the paragraph corresponding to FIG. 13 and the drain electrode of the transistor 501 is coupled to the node between the transistors 431 and 432.

The memory device 700 depicted in FIG. 17 is given for illustrative purposes. Various implements of the memory device 700 are within the contemplated scope of the present disclosure. For example, in some embodiments, the transistor 501 is a p-type transistor.

Figure 18:
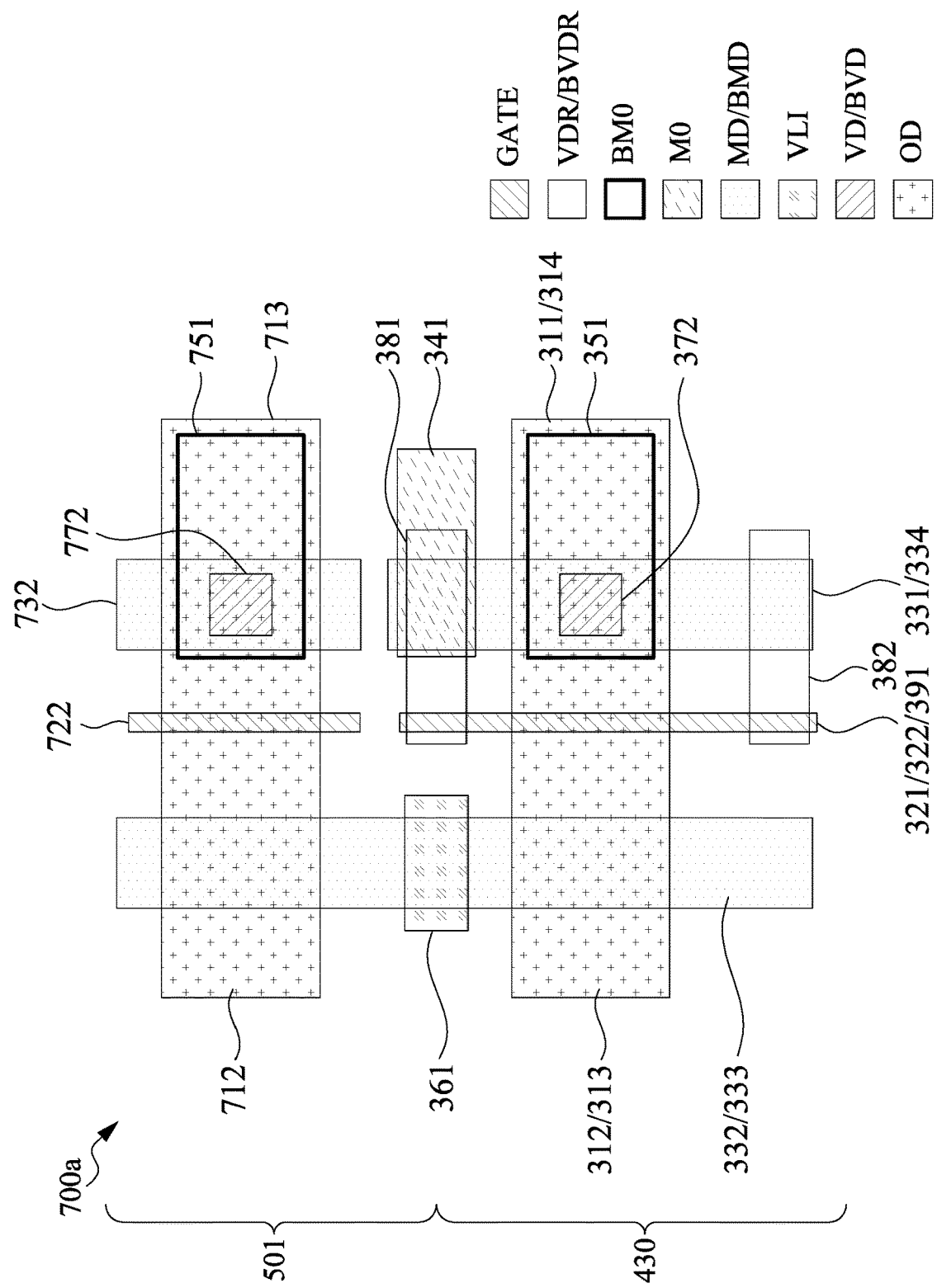
FIG. 18 is a diagram of a layout of a part of a memory device in a plan view, in accordance with some embodiments.

Reference is now made to FIG. 18. FIG. 18 is a diagram of a layout 700a of a part of the memory device 700 corresponding to the suppressing circuit 430 and the transistor 501 of FIG. 17 in a plan view, in accordance with some embodiments. The suppressing circuit 430 of the part of the memory device 700 with the layout 700a in FIG. 18 is configured with respected to the suppressing circuit 430 with the layout 430a in FIG. 12 With respect to the embodiments of FIGS. 1-17, like elements in the embodiments of FIG. 18 are designated with the same reference numbers for ease of understanding. The specific operations of similar elements, which are already discussed in detail in above paragraphs, are omitted herein for the sake of brevity.

As shown in FIG. 18, in addition to elements like the active region 311 included in the suppressing circuit 330, the part of the memory device 700 with the layout 700a further includes active regions 712, 713, a gate 722, a conductive segment 732, a via 772 and a conductive line 751. In some embodiments, the active regions 712, 713, the gate 722, the conductive segments 333, 732 together correspond to the transistor 501 in FIG. 14. The gate 722 extends along the direction y and separated from the gate 322 along the direction y. The active regions 712, 713 is disposed at first and second sides of the gate 722 along the direction x. The active region 712 is disposed above the conductive segment 333 and coupled to the conductive segment 333. Similarly, the active region is disposed above the conductive segment 732 and coupled to the conductive segment 732. The via 772 is disposed below the conductive segment 732 and above the conductive line 751 that is coupled to the supply voltage rail of the supply voltage VSS. The via 772 couples the conductive line 752 to the conductive segment 731 to provide the supply voltage VSS to the structure operating as the transistor 501.

The memory device 700 with the layout 700a depicted in FIG. 18 is given for illustrative purposes. Various implements of the memory device 700 with the layout 700a are within the contemplated scope of the present disclosure. For example, in some embodiments, the conductive line 341 is in a metal layer above the metal zero layer (M0).

Figure 19B:
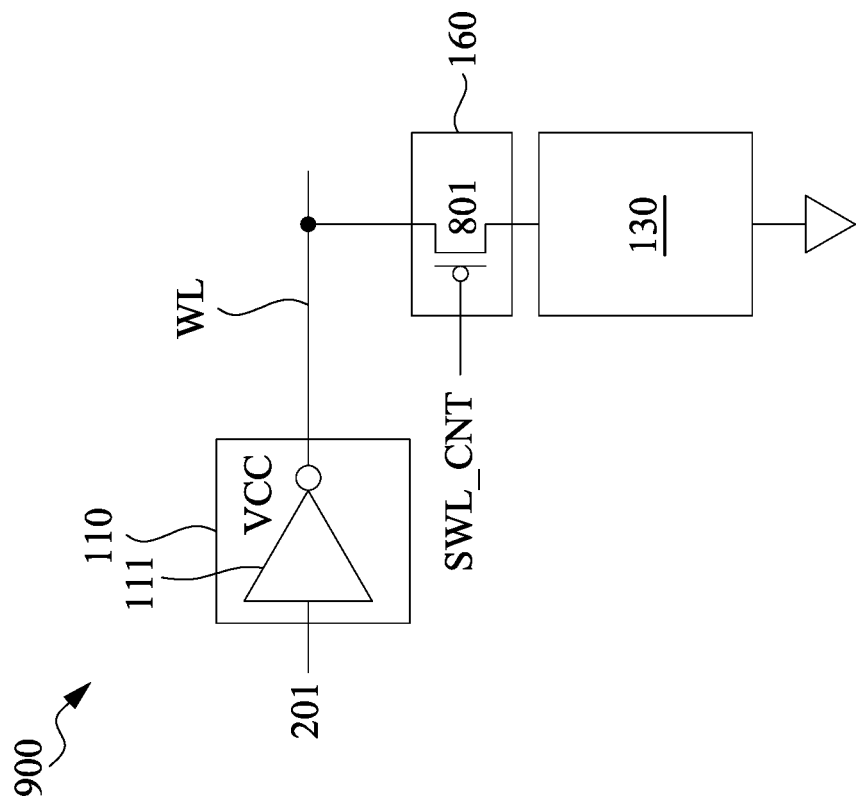
FIG. 19B is a schematic diagrams of a memory devices, in accordance with some embodiments.
Figure 19A:
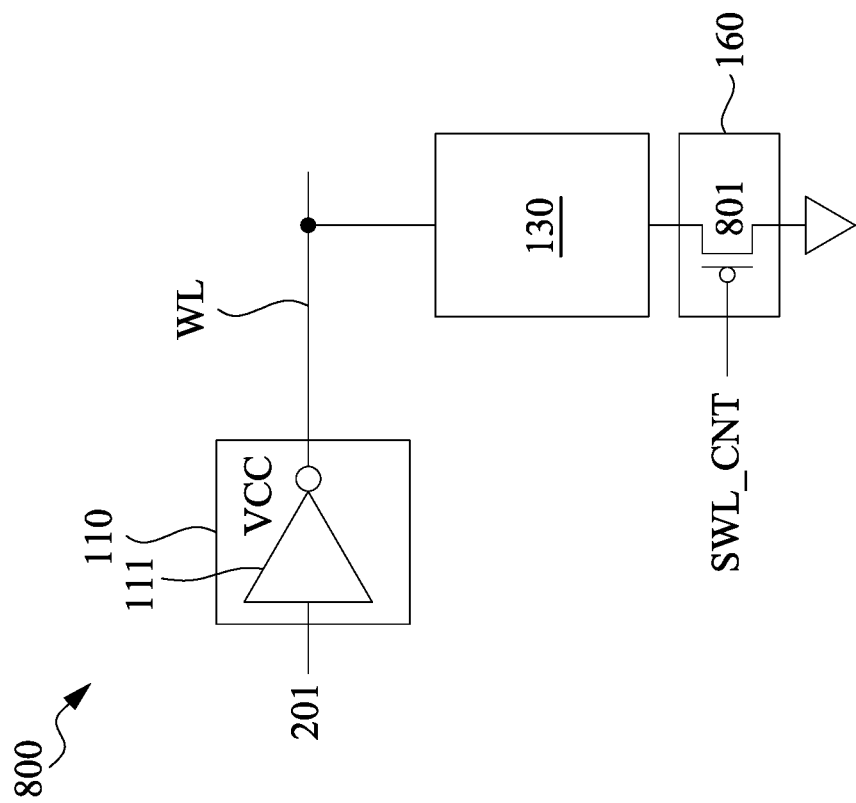
FIG. 19A is a schematic diagrams of a memory devices, in accordance with some embodiments.

Reference is now made to FIG. 19A. FIG. 19A is a schematic diagrams of a memory devices 800 configured with respect to the memory device 200 of FIG. 2, in accordance with some embodiments. With respect to the embodiments of FIGS. 1-18, like elements in FIG. 19A are designated with the same reference numbers for ease of understanding. Compared with the memory device 200 of FIG. 2, the memory devices 800 of FIG. 19A further include an enabling circuit 160 coupled between the suppressing circuit 130 and the supply voltage rail of the supply voltage VSS. The enabling circuit 160 is a circuit to enable or disable operation of suppressing circuit 130.

In some embodiments, the enabling circuit 160 of the memory device 800 include a transistor 801 that is configured to turn on in response to a control signal SWL_CNT and is coupled between the suppressing circuit 130 and the supply voltage rail of the supply voltage VSS. In some embodiments, the transistor 801 is embodied as a p-type transistor as shown in FIG. 19A.

In one configuration, the control signal SWL_CNT may be the voltage input 201 of the word line driver 110 or a separate control signal generated by the control signal generator 140. In some embodiments, the control signal SWL_CNT may have a high state (or 1V) when the voltage output 202 of the word line driver 110 has a low state (e.g., 0V). In addition, the control signal SWL_CNT may have a low state (or 0V) when the voltage output 202 of the word line driver 110 has a high state (e.g., 0.5-1.2V). Accordingly, when the voltage output 202 of the word line driver 110 has the low state (e.g., 0V), the transistor 801 can be disabled to prevent current flow through the suppressing circuit 130. When the voltage output 202 of the word line driver 110 has the high state (e.g., 0.5-1.2V), the transistor 801 can be enabled to allow current flow through the suppressing circuit 130. In some embodiments, the control signal SWL_CNT enables the suppressing circuit 130 for a brief time period to improve operating speed (e.g., reading speed) of the memory device 100, as described below with respect to FIG. 20.

Reference is now made to FIG. 19B. FIG. 19B is a schematic diagrams of a memory devices 900 configured with respect to the memory device 800 of FIG. 19A, in accordance with some embodiments. With respect to the embodiments of FIGS. 1-19A, like elements in FIG. 19B are designated with the same reference numbers for ease of understanding. Compared with the enabling circuit 160 of the memory device 800 of FIG. 19A, the enabling circuit 160 of the memory devices 900 of FIG. 19B is coupled between the suppressing circuit 130 and the word line WL and the transistor 801 included in the enabling circuit 160 in some embodiments is coupled between the suppressing circuit 130 and the word line WL.

Figure 20:
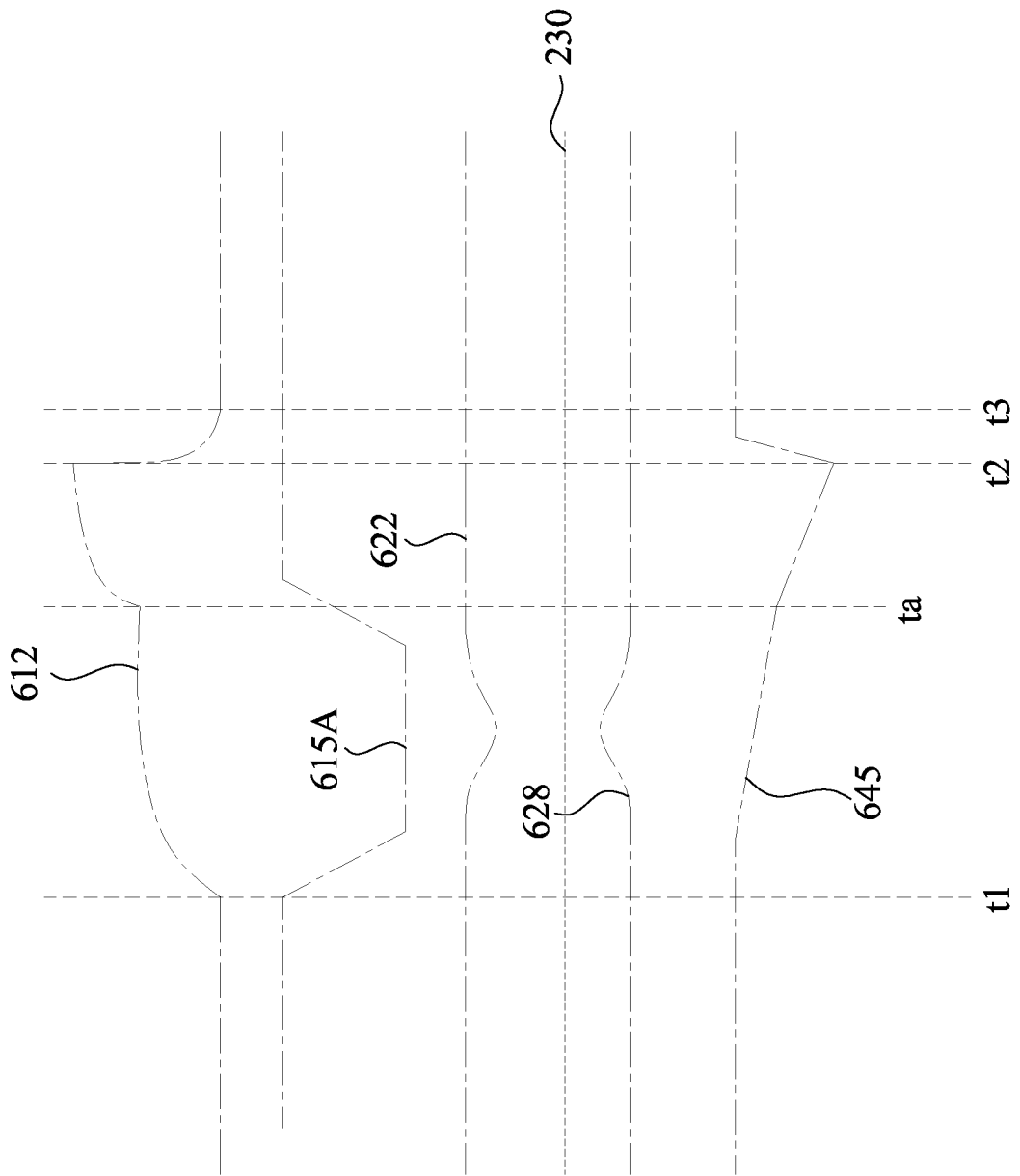
FIG. 20 is a timing diagram showing an operation of a memory device, in accordance with some embodiments.

Reference is now made to FIG. 20. FIG. 20 is a timing diagram showing an operation of the memory device 800 of FIG. 19A or the memory device 900 of FIG. 19B for the voltage range R1 of voltage output 202 of the word line driver 110 described in FIG. 3, in accordance with some embodiments. The timing diagram of FIG. 20 includes a plot 612 for the voltage output 202 of the word line driver 110 with the suppressing circuit 130. The timing diagram of FIG. 20 includes a plot 615A showing the control signal SWL_CNT to control the transistor 801. The timing diagram of FIG. 20 also includes a plot 622 for the voltage at the port QB with the suppressing circuit 130. The timing diagram of FIG. 20 also includes a plot 628 for the voltage at the port Q with the suppressing circuit 130. The timing diagram of FIG. 20 also includes a plot 645 for the voltage at the bit line BL with the suppressing circuit 130.

In one example shown in FIG. 20, the memory cell 105 is programmed such that the port Q has a low voltage (e.g., supply voltage VSS) and the port QB has a high voltage (e.g., supply voltage VCC). Before time t1, voltages of the bit lines BL, BLB can be pre-charged to the high voltage by the bit line controller 103. Before time t1, the voltage output 202 of the word line driver 110 is the low voltage, such that the transistors N3, N4 may be disabled. By disabling the transistors N3, N4, the bit line BL can be electrically decoupled from the port Q. and the bit line BLB can be electrically decoupled from the port QB.

The word line driver 110 increases the voltage output 202 from time t1 to time t2 and decreases the voltage output 202 to be the supply voltage VSS from time t2 to time t3. From time t1 to time t3, the word line driver 110 can generate a voltage sufficient to enable the transistors N3, N4. By enabling the transistors N3, N4, the bit line BL can be electrically coupled to the port Q, and the bit line BLB can be electrically coupled to the port QB. Because the voltage of the port QB is the high voltage before time t1, the voltage of the bit line BLB may remain unchanged from time t1 to time t3. However, because the voltage of the port Q is the low voltage before time t1, the voltage at the bit line BL can decrease from time t1 to time t2. Based on the difference in the voltage of the bit line BL and the voltage of the bit line BLB, data stored by the memory cell 105 can be determined.

After time t3, the voltage output 202 is the supply voltage VSS, such that the transistors N3, N4 may be disabled. By disabling the transistors N3, N4, the bit line BL can be electrically decoupled from the port Q, and the bit line BLB can be electrically decoupled from the port QB. After time t3, voltages of the bit lines BL, BLB can be pre-charged to the high voltage by the bit line controller 103.

From time t1 to time ta, the control signal SWL_CNT may have a low state (or 0V) to enable the suppressing circuit 130. During the period of time t1 to time ta, the suppressing circuit 130 is enabled to suppress the voltage output 202 to prevent a bit flip. For example, as shown in the plot 612, the suppressing circuit 130 can suppress or reduce the voltage output 202. By reducing or suppressing the voltage output 202, the voltages at the ports Q. QB may not cross the flipping point 230 as shown in the plots 622, 628, such that a bit flip may not occur. Despite the reduced voltage difference at the bit lines BL, BLB due to the suppression, the high voltage output 202 from the word line driver 110 may be sufficient to ensure sufficient voltage separation between the bit lines BL, BLB in the period from time t1 to time ta.

From time ta to time t3, the control signal SWL_CNT may have a high state (or supply voltage VCC) to disable the suppressing circuit 130. In some embodiments, by disabling the suppressing circuit 130, the voltage output 202 of the word line driver 110 can be increased, for example, to a supply voltage (e.g., the supply voltage VCC) as shown in the plot 612. By applying the high voltage or supply voltage from time ta to time t2, the voltage at the bit line BL can be discharged faster as shown in the plot 645. Discharging the bit line BL at a higher rate can reduce a time for the voltage separation of the voltages at the bit lines BL, BLB to reach a sufficient level to read data stored by the memory cell 105.

Figure 21:
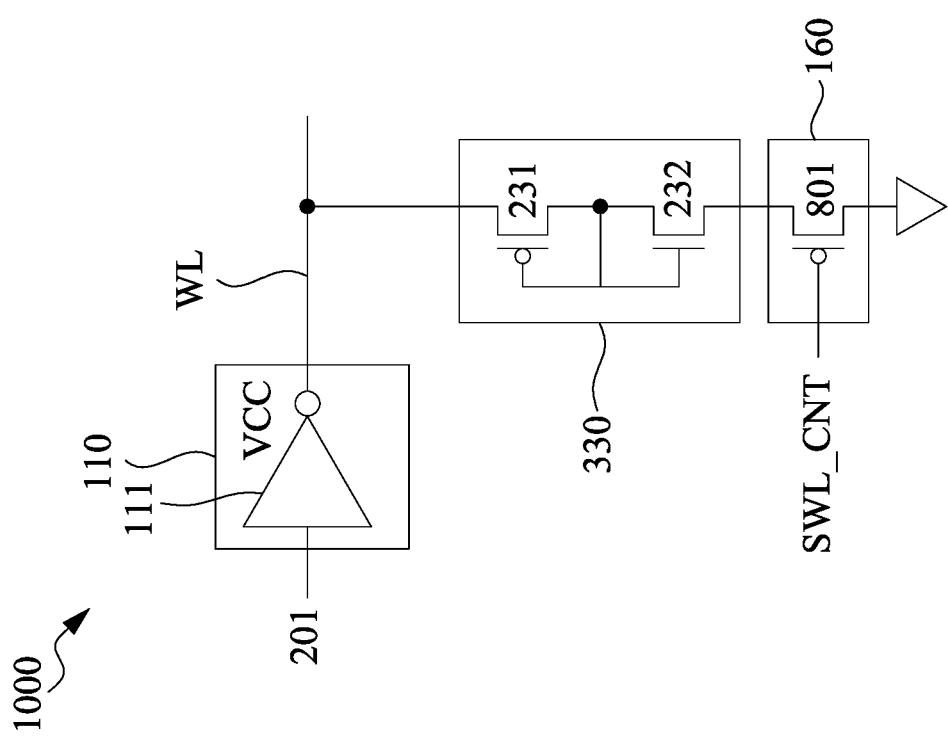
FIG. 21 is a schematic diagram of a memory device, in accordance with some embodiments.

Reference is now made to FIG. 21. FIG. 21 is a schematic diagram of a memory device 1000 configured with respect to the memory device 800 of FIG. 19A, in accordance with some embodiments. With respect to the embodiments of FIGS. 1-20, like elements in FIG. 21 are designated with the same reference numbers for ease of understanding. Compared with the memory device 800 of FIG. 19A, the memory device 1000 has the suppressing circuit 330 configured with regard to the embodiment of FIG. 5 instead of the suppressing circuit 130.

Figure 22:
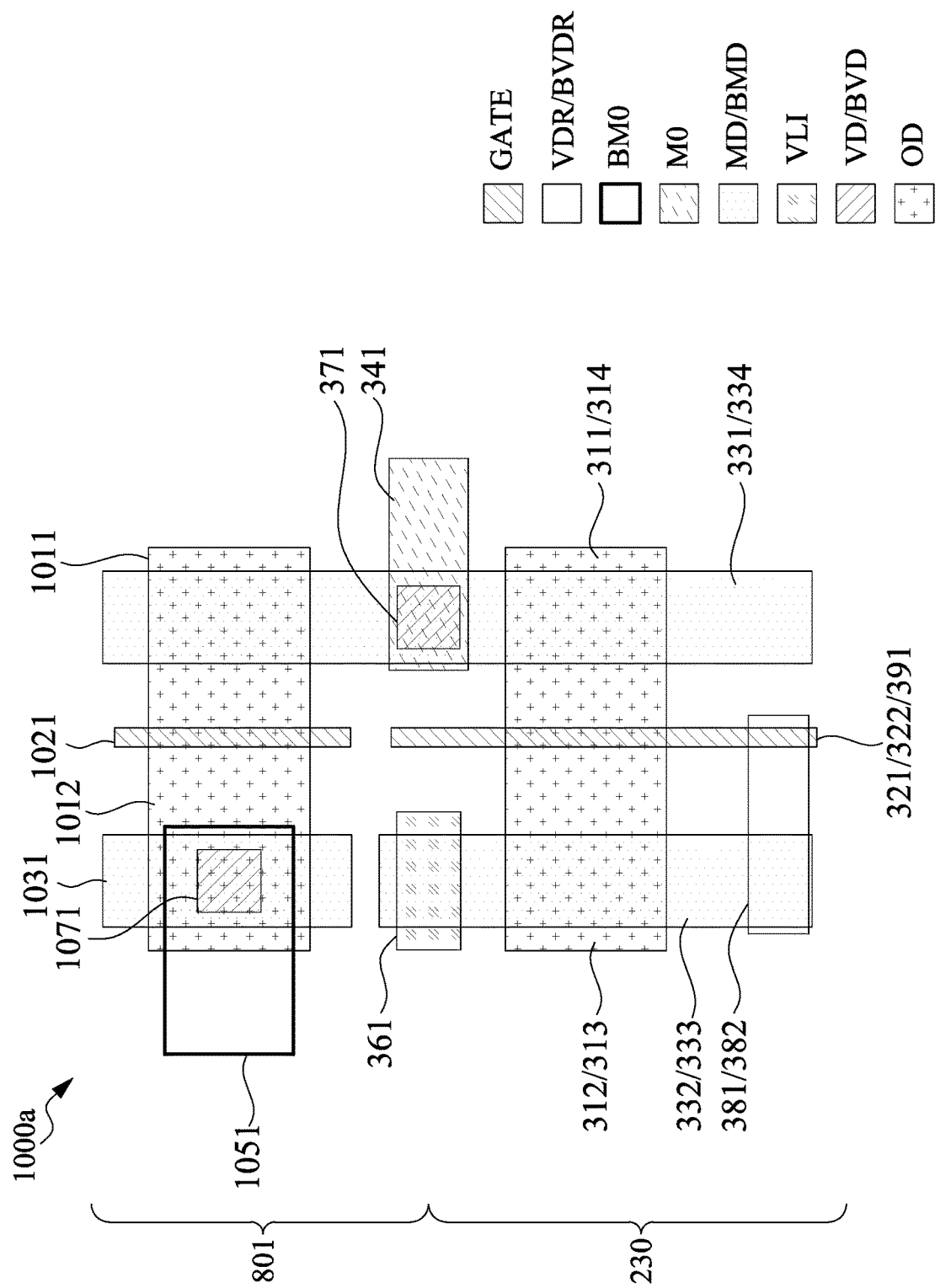
FIG. 22 is a diagram of a layout of a part of a memory device in a plan view, in accordance with some embodiments.

Reference is now made to FIG. 22. FIG. 22 is a diagram of a layout 1000a of a part of the memory device 1000 corresponding to the suppressing circuit 330 and the transistor 801 of FIG. 21 in a plan view, in accordance with some embodiments. The suppressing circuit 330 of the part of the memory device 1000 with the layout 1000a in FIG. 22 is configured with respected to the suppressing circuit 330 with the layout 330a in FIG. 6. With respect to the embodiments of FIGS. 1-21, like elements in the embodiments of FIG. 22 are designated with the same reference numbers for ease of understanding. The specific operations of similar elements, which are already discussed in detail in above paragraphs, are omitted herein for the sake of brevity.

As shown in FIG. 22, compared to the suppressing circuit 330 with the layout 330a in FIG. 6, the part of the memory device 1000 with the layout 1000a includes a conductive line 1051 and a via 1071 instead of the conductive line 351 and the via 372 and further includes active regions 1011, 1012, a gate 1021, a conductive segment 1031. In some embodiments, the active regions 1011, 1012, the gate 1021, the conductive segments 334, 1031 together correspond to the transistor 801 in FIG. 21. The gate 1021 extends along the direction y and separated from the gate 322 along the direction y. The active regions 1011, 1012 is disposed at first and second sides of the gate 1021 along the direction x. The active region 1011 is disposed above the conductive segment 334 and coupled to the conductive segment 334. Similarly, the active region 1012 is disposed above the conductive segment 1031 and coupled to the conductive segment 1031. The via 1071 is disposed below the conductive segment 1032 and above the conductive line 1051 that is coupled to the supply voltage rail of the supply voltage VSS. The via 1071 couples the conductive line 1051 to the conductive segment 1031 to provide the supply voltage VSS to the structure operating as the transistor 801.

Figure 23:
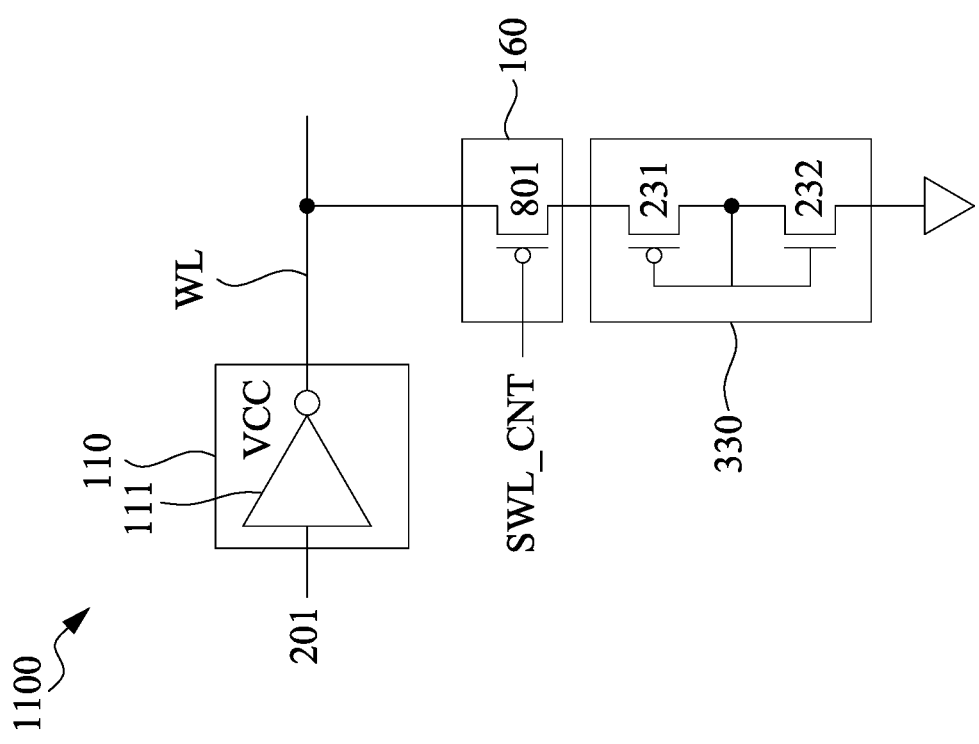
FIG. 23 is a schematic diagram of a memory device, in accordance with some embodiments.

Reference is now made to FIG. 23. FIG. 23 is a schematic diagram of a memory device 1000 configured with respect to the memory device 900 of FIG. 19B, in accordance with some embodiments. With respect to the embodiments of FIGS. 1-22, like elements in FIG. 23 are designated with the same reference numbers for ease of understanding. Compared with the memory device 900 of FIG. 19B, the memory device 1100 has the suppressing circuit 330 configured with regard to the embodiment of FIG. 5 instead of the suppressing circuit 130.

Figure 24:
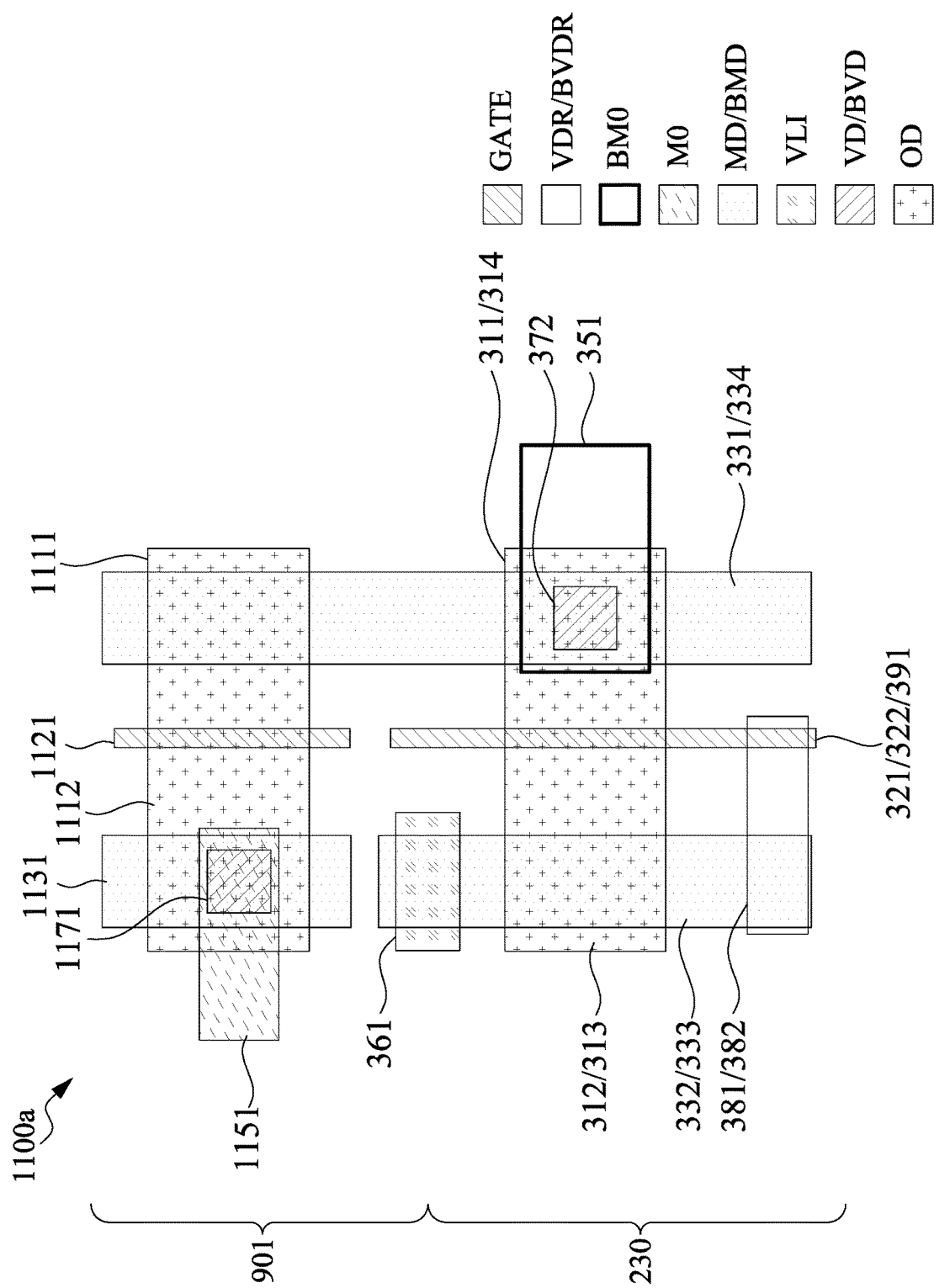
FIG. 24 is a diagram of a layout of a part of a memory device in a plan view, in accordance with some embodiments.

Reference is now made to FIG. 24. FIG. 24 is a diagram of a layout 1100a of a part of the memory device 1100 corresponding to the suppressing circuit 330 and the transistor 801 of FIG. 23 in a plan view, in accordance with some embodiments. The suppressing circuit 330 of the part of the memory device 1100 with the layout 1100a in FIG. 24 is configured with respected to the suppressing circuit 330 with the layout 330a in FIG. 6. With respect to the embodiments of FIGS. 1-23, like elements in the embodiments of FIG. 24 are designated with the same reference numbers for ease of understanding. The specific operations of similar elements, which are already discussed in detail in above paragraphs, are omitted herein for the sake of brevity.

As shown in FIG. 24, compared to the suppressing circuit 330 with the layout 330a in FIG. 6, the part of the memory device 1100 with the layout 1100a includes a conductive line 1151 and a via 1171 instead of the conductive line 341 and the via 371 and further includes active regions 1111, 1112, a gate 1121, a conductive segment 1131. In some embodiments, the active regions 1111, 1112, the gate 1121, the conductive segments 331, 1131 together correspond to the transistor 801 in FIG. 23. The gate 1121 extends along the direction y and separated from the gate 322 along the direction y. The active regions 1111, 1112 is disposed at first and second sides of the gate 1121 along the direction x. The active region 1111 is disposed below the conductive segment 331 and coupled to the conductive segment 331. Similarly, the active region 1112 is disposed below the conductive segment 1131 and coupled to the conductive segment 1131. The via 1171 is disposed above the conductive segment 1131 and below the conductive line 1151 that is coupled to the word line WL. The via 1171 couples the conductive line 1151 to the conductive segment 1131 to transmit the voltage output 202 to the structure operating as the transistor 801.

Figure 25:
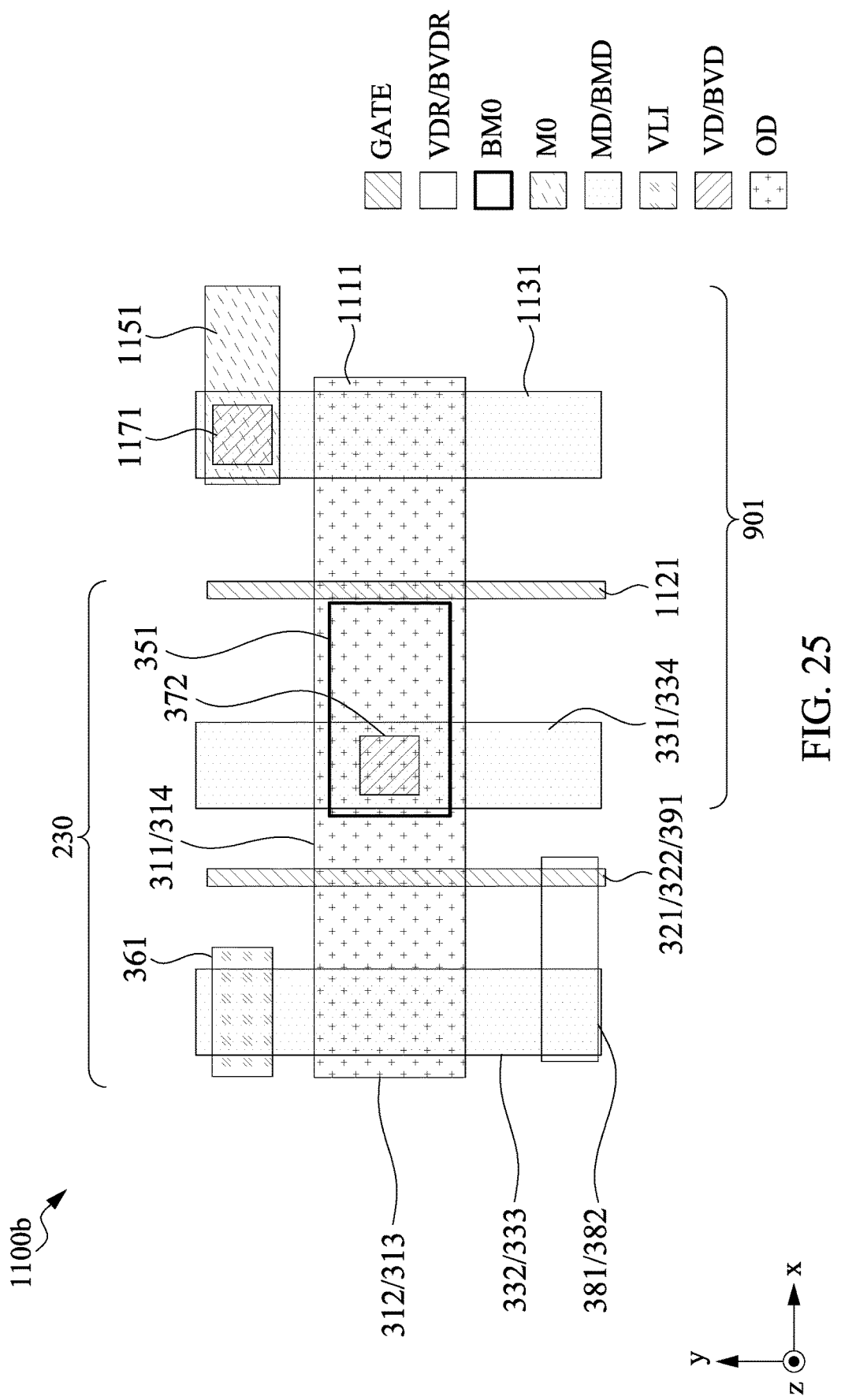
FIG. 25 is a diagram of a layout of a part of a memory device in a plan view, in accordance with some embodiments.

Reference is now made to FIG. 25. FIG. 25 is a diagram of a layout 1100b of a part of the memory device 1100 corresponding to the suppressing circuit 330 and the transistor 801 of FIG. 23 in a plan view, in accordance with some embodiments. The suppressing circuit 330 of the part of the memory device 1100 with the layout 1100a in FIG. 25 is configured with respected to the suppressing circuit 330 with the layout 330a in FIG. 6. With respect to the embodiments of FIGS. 1-23, like elements in the embodiments of FIG. 25 are designated with the same reference numbers for ease of understanding. The specific operations of similar elements, which are already discussed in detail in above paragraphs, are omitted herein for the sake of brevity.

As shown in FIG. 25, compared to the suppressing circuit 330 with the layout 330a in FIG. 6, the part of the memory device 1100 with the layout 1100a includes a conductive line 1151 and a via 1171 instead of the conductive line 341 and the via 371 and further includes an active region 1111, a gate 1121, a conductive segment 1131. In some embodiments, the active regions 311, 1111, the gate 1121, the conductive segments 331, 1131 together correspond to the transistor 801 in FIG. 23. The gate 1121 extends along the direction y and separated from the gate 322 along the direction x. The active regions 311, 1111 are disposed at first and second sides of the gate 1121 along the direction x. The active region 1111 is disposed below the conductive segment 1131 and coupled to the conductive segment 1131. The via 1171 is disposed above the conductive segment 1131 and below the conductive line 1151 that is coupled to the word line WL. The via 1171 couples the conductive line 1151 to the conductive segment 1131 to transmit the voltage output 202 to the structure operating as the transistor 801.

Figure 26B:
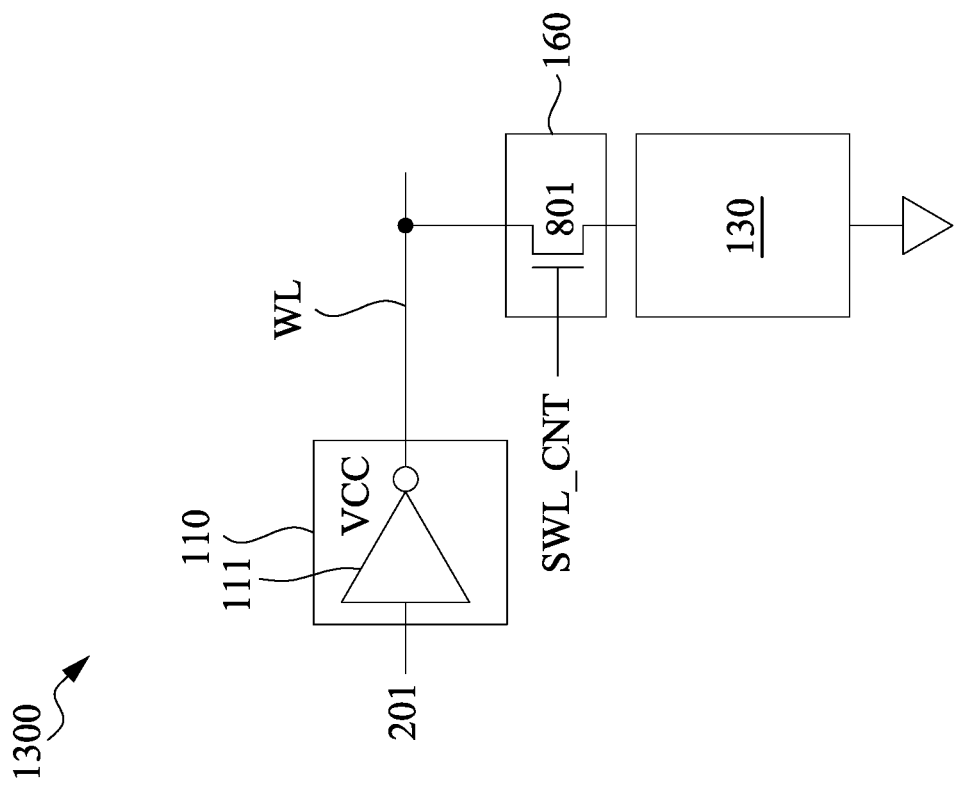
FIG. 26B is a schematic diagrams of a memory devices, in accordance with some embodiments.
Figure 26A:
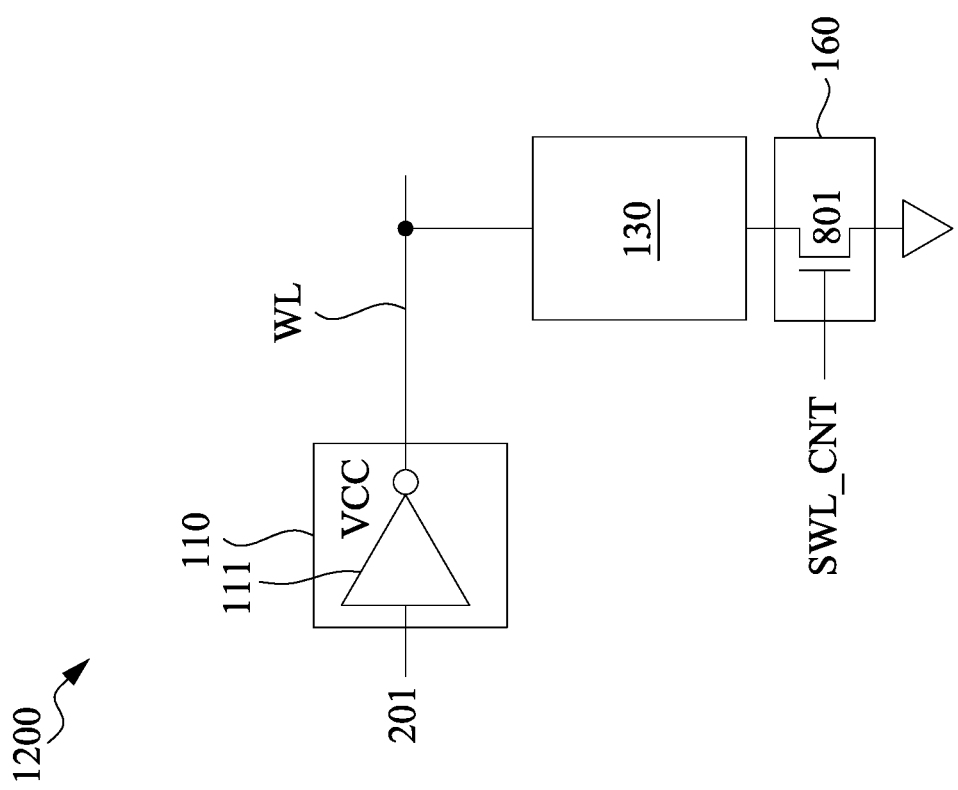
FIG. 26A is a schematic diagrams of a memory device, in accordance with some embodiments.

Reference is now made to FIG. 26A. FIG. 26A is a schematic diagrams of a memory devices 1200 configured with respect to the memory device 1000 of FIG. 19A, in accordance with some embodiments. With respect to the embodiments of FIGS. 1-25, like elements in FIG. 26A are designated with the same reference numbers for ease of understanding. Compared with the transistor 801 of the memory device 800 of FIG. 19A, the transistor 801 of the memory devices 1200 of FIG. 26A is a n-type transistor.

Reference is now made to FIG. 26B. FIG. 26B is a schematic diagrams of a memory devices 1300 configured with respect to the memory device 900 of FIG. 19B, in accordance with some embodiments. With respect to the embodiments of FIGS. 1-25, like elements in FIG. 26B are designated with the same reference numbers for ease of understanding. Compared with the transistor 801 of the memory device 900 of FIG. 19B, the transistor 801 of the memory devices 1300 of FIG. 26B is a n-type transistor.

Reference is now made to FIG. 27. FIG. 27 is a timing diagram showing an operation of the memory device 1200 of FIG. 26A or the memory device 1300 of FIG. 26B for the voltage range R1 of voltage output 202 of the word line driver 110 described in FIG. 3, in accordance with some embodiments. The operation of the memory device 1200 of FIG. 26A or the memory device 1300 of FIG. 26B shown in the timing diagram of FIG. 27 is similar to the operation of the memory device 800 of FIG. 19A or the memory device 900 of FIG. 19B shown in the timing diagram of FIG. 20, except the control signal SWL_CNT may have a high voltage (a pulse) from time t1 to time ta to enable the suppressing circuit 130 as shown in the plot 615B in FIG. 27.

Figure 28:
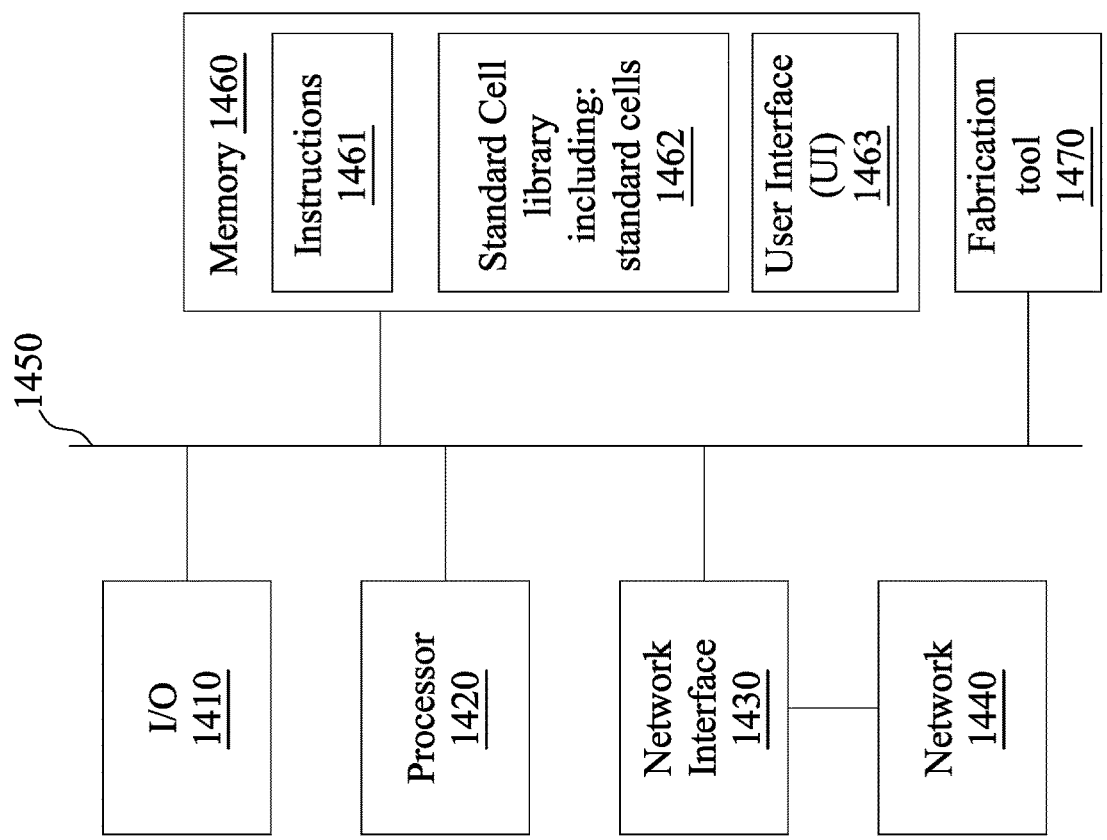
FIG. 28 is a block diagram of an electronic design automation system, in accordance with some embodiments.

Reference is now made to FIG. 28. FIG. 28 is a block diagram of an electronic design automation (EDA) system 1400 for designing the integrated circuit layout design, in accordance with some embodiments of the present disclosure. EDA system 1400 is configured to implement layout design of the layouts 330a, 430a, 600a, 600b, 1400a, 1000a, 1100a and 1100b disclosed in FIGS. 6, 15, 18, 19A, 19B and 21.

In some embodiments, EDA system 1400 is a general purpose computing device including a hardware processor 1420 and a non-transitory, computer-readable storage medium 1460. Storage medium 1460, amongst other things, is encoded with, i.e., stores, computer program code (instructions) 1461, i.e., a set of executable instructions. Execution of instructions 1461 by hardware processor 1420 represents (at least in part) an EDA tool which implements a portion or all of the methods for implementing layout design of the layouts 330a. 430a, 600a, 600b, 1400a, 1000a, 1100a and 1100b disclosed in FIGS. 6, 15, 18, 19A, 19B and 21 in accordance with one or more embodiments.

The processor 1420 is electrically coupled to computer-readable storage medium 1460 via a bus 1450. The processor 1420 is also electrically coupled to an I/O interface 1410 and a fabrication tool 1470 by bus 1450. A network interface 1430 is also electrically connected to processor 1420 via bus 1450. Network interface 1430 is connected to a network 1440, so that processor 1420 and computer-readable storage medium 1460 are capable of connecting to external elements via network 1440. The processor 1420 is configured to execute computer program code 1461 encoded in computer-readable storage medium 1460 in order to cause EDA system 1400 to be usable for performing a portion or all of the noted processes and/or methods. In one or more embodiments, processor 1420 is a central processing unit (CPU), a multi-processor, a distributed processing system, an application specific integrated circuit (ASIC), and/or a suitable processing unit.

In one or more embodiments, computer-readable storage medium 1460 is an electronic, magnetic, optical, electro-magnetic, infrared, and/or a semiconductor system (or apparatus or device). For example, computer-readable storage medium 1460 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1460 includes a compact disk-read only memory (CD-ROM), a compact disk-read/write (CD-R/W), and/or a digital video disc (DVD).

In one or more embodiments, storage medium 1460 stores computer program code 1461 configured to cause EDA system 1400 (where such execution represents (at least in part) the EDA tool) to be usable for performing a portion or all of the noted processes and/or methods. In one or more embodiments, storage medium 1460 also stores information which facilitates performing a portion or all of the noted processes and/or methods. In one or more embodiments, storage medium 1460 stores library 1462 of standard cells including such standard cells as disclosed herein, for example, a cell including transistors 231, 232, 431 and 432 discussed above with respect to FIGS. 5 and 11.

EDA system 1400 includes I/O interface 1410. I/O interface 1410 is coupled to external circuitry. In one or more embodiments, I/O interface 1410 includes a keyboard, keypad, mouse, trackball, trackpad, touchscreen, and/or cursor direction keys for communicating information and commands to processor 1420.

EDA system 1400 also includes network interface 1430 coupled to processor 1420. Network interface 1430 allows EDA system 1400 to communicate with network 1440, to which one or more other computer systems are connected. Network interface 1430 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1400.

EDA system 1400 also includes the fabrication tool 1470 coupled to processor 1420. The fabrication tool 1470 is configured to fabricate integrated circuits, e.g., the integrated circuits of memory device 100 illustrated in FIG. 1, according to the design files processed by the processor 1420.

EDA system 1400 is configured to receive information through I/O interface 1410. The information received through I/O interface 1410 includes one or more of instructions, data, design rules, libraries of standard cells, and/or other parameters for processing by processor 1420. The information is transferred to processor 1420 via bus 1450. EDA system 1400 is configured to receive information related to a UI through I/O interface 1410. The information is stored in computer-readable medium 1460 as user interface (UI) 1463.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1400. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, for example, one or more of an optical disk, such as a DVD, a magnetic disk, such as a hard disk, a semiconductor memory, such as a ROM, a RAM, a memory card, and the like.

Figure 29:
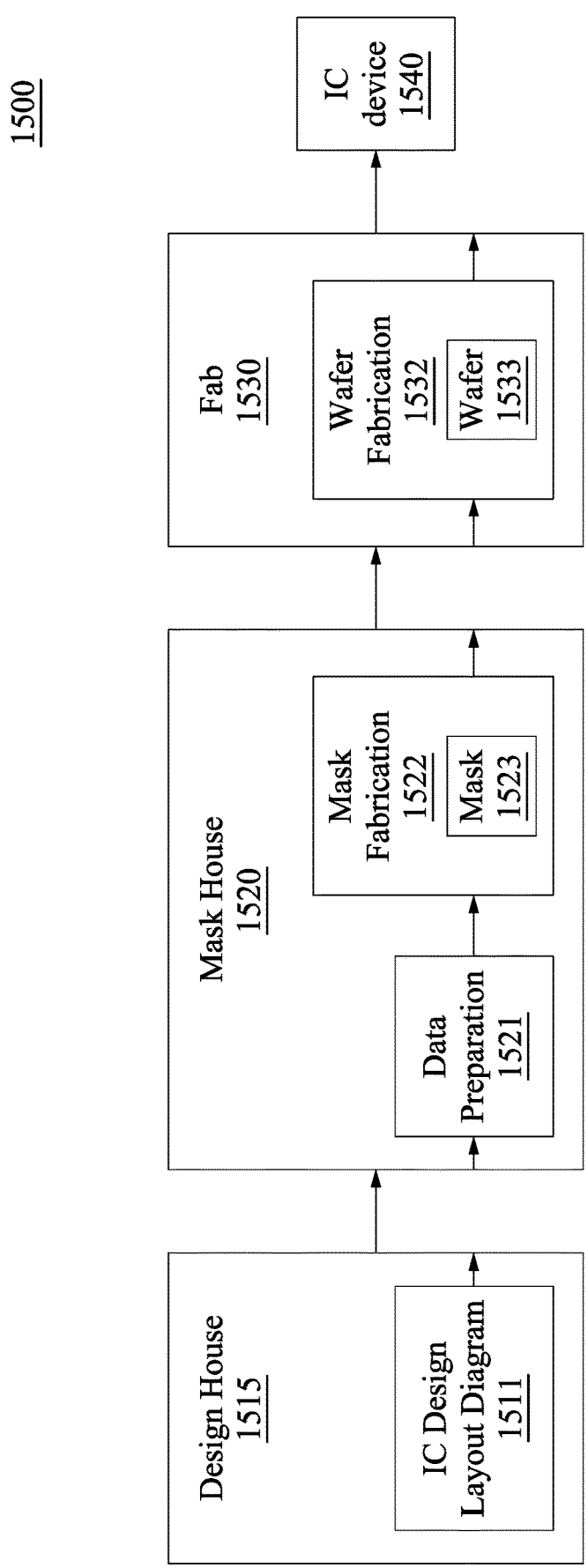
FIG. 29 is a block diagram of IC manufacturing system and an IC manufacturing flow associated therewith, in accordance with some embodiments.

FIG. 29 is a block diagram of IC manufacturing system 1500, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using IC manufacturing system 1500.

In FIG. 29, IC manufacturing system 1500 includes entities, such as a design house 1510, a mask house 1520, and an IC manufacturer/fabricator ("fab") 1530, that interact with one another in the design, development, and manufacturing cycles and/or services related to manufacturing an IC device 1540. The entities in IC manufacturing system 1500 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1510, mask house 1520, and IC fab 1530 is owned by a single larger company. In some embodiments, two or more of design house 810, mask house 1520, and IC fab 1530 coexist in a common facility and use common resources.

Design house (or design team) 1510 generates an IC design layout diagram 1511. IC design layout diagram 1511 includes various geometrical patterns, for example, the layouts 330a, 430a, 600a, 600b, 700a, 1000a, 1100a and 1100b discussed above with respect to FIGS. 6, 15, 18, 19A, 19B and 21. The geometrical patterns correspond to patterns of metal, oxide, or semiconductor layers that make up the various components of IC device 1540 to be fabricated. The various layers combine to form various IC features. For example, a portion of IC design layout diagram 1511 includes various IC features, such as an active region, gate electrode, source and drain, conductive segments or vias of an interlayer interconnection, to be formed in a semiconductor substrate (such as a silicon wafer) and various material layers disposed on the semiconductor substrate. Design house 1510 implements a proper design procedure to form IC design layout diagram 1511. The design procedure includes one or more of logic design, physical design or place and route. IC design layout diagram 1511 is presented in one or more data files having information of the geometrical patterns. For example, IC design layout diagram 1511 can be expressed in a GDSII file format or DFII file format.

Mask house 1520 includes data preparation 1521 and mask fabrication 1522. Mask house 1520 uses IC design layout diagram 1511 to manufacture one or more masks 1523 to be used for fabricating the various layers of IC device 1540 according to IC design layout diagram 1511. Mask house 1520 performs mask data preparation 1521, where IC design layout diagram 1511 is translated into a representative data file ("RDF"). Mask data preparation 1521 provides the RDF to mask fabrication 1522. Mask fabrication 1522 includes a mask writer. A mask writer converts the RDF to an image on a substrate, such as a mask (reticle) 1523 or a semiconductor wafer 1533. The IC design layout diagram 1511 is manipulated by mask data preparation 1521 to comply with particular characteristics of the mask writer and/or requirements of IC fab 1530. In FIG. 8, data preparation 1521 and mask fabrication 1522 are illustrated as separate elements. In some embodiments, data preparation 1521 and mask fabrication 1522 can be collectively referred to as mask data preparation.

In some embodiments, data preparation 1521 includes optical proximity correction (OPC) which uses lithography enhancement techniques to compensate for image errors, such as those that can arise from diffraction, interference, other process effects and the like. OPC adjusts IC design layout diagram 1511. In some embodiments, data preparation 1521 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, data preparation 1521 includes a mask rule checker (MRC) that checks the IC design layout diagram 1511 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1511 to compensate for limitations during mask fabrication 1522, which may undo part of the modifications performed by OPC in order to meet mask creation rules.

In some embodiments, data preparation 1521 includes lithography process checking (LPC) that simulates processing that will be implemented by IC fab 1530 to fabricate IC device 1540. LPC simulates this processing based on IC design layout diagram 1511 to create a simulated manufactured device, such as IC device 1540. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1511.

It should be understood that the above description of data preparation 1521 has been simplified for the purposes of clarity. In some embodiments, data preparation 1521 includes additional features such as a logic operation (LOP) to modify the IC design layout diagram 1511 according to manufacturing rules. Additionally, the processes applied to IC design layout diagram 1511 during data preparation 1521 may be executed in a variety of different orders.

After data preparation 1521 and during mask fabrication 1522, a mask 1523 or a group of masks 1523 are fabricated based on the modified IC design layout diagram 1511. In some embodiments, mask fabrication 1522 includes performing one or more lithographic exposures based on IC design layout diagram 1511. In some embodiments, an electron-beam (e-beam) or a mechanism of multiple e-beams is used to form a pattern on a mask (photomask or reticle) 1523 based on the modified IC design layout diagram 1511. Mask 1523 can be formed in various technologies. In some embodiments, mask 1523 is formed using binary technology. In some embodiments, a mask pattern includes opaque regions and transparent regions. A radiation beam, such as an ultraviolet (UV) beam, used to expose the image sensitive material layer (for example, photoresist) which has been coated on a wafer, is blocked by the opaque region and transmits through the transparent regions. In one example, a binary mask version of mask 1523 includes a transparent substrate (for example, fused quartz) and an opaque material (for example, chromium) coated in the opaque regions of the binary mask. In another example, mask 1523 is formed using a phase shift technology. In a phase shift mask (PSM) version of mask 1523, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1522 is used in a variety of processes. For example, such a mask(s) is used in an ion implantation process to form various doped regions in semiconductor wafer 1533, in an etching process to form various etching regions in semiconductor wafer 1533, and/or in other suitable processes.

IC fab 1530 includes wafer fabrication 1532. IC fab 1530 is an IC fabrication business that includes one or more manufacturing facilities for the fabrication of a variety of different IC products. In some embodiments, IC Fab 1530 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1530 uses mask(s) 1523 fabricated by mask house 1520 to fabricate IC device 1540. Thus, IC fab 1530 at least indirectly uses IC design layout diagram 1511 to fabricate IC device 1540. In some embodiments, semiconductor wafer 1533 is fabricated by IC fab 1530 using mask(s) 1523 to form IC device 1540. In some embodiments, the IC fabrication includes performing one or more lithographic exposures based at least indirectly on IC design layout diagram 1511. Semiconductor wafer 1533 includes a silicon substrate or other proper substrate having material layers formed thereon. Semiconductor wafer 1533 further includes one or more of various doped regions, dielectric features, multi-level interconnects, and the like (formed at subsequent manufacturing steps).

As described above, the suppressing circuit in the present disclosure can improve a stability of operation of the memory device without lowering an operating speed (or reading speed) of the memory device. The suppressing circuit in the present disclosure includes metal routing on a backside of the suppressing circuit. Accordingly, a memory device including the suppressing circuit with greater design flexibility with higher effectiveness of metal routing is provided.

In some embodiments, a memory device is provided. The memory device comprises a memory cell, a first power rail and a suppressing circuit. The memory cell is coupled to a word line. The first power rail transmits a first supply voltage. The suppressing circuit comprises a first transistor and a second transistor. The first transistor is diode-connected, coupled to the word line, and disposed at a first layer. The second transistor is diode-connected coupled between the first transistor and the first power rail, and disposed at a second layer under the first layer. The first transistor and the second transistor overlap with each other in a layout view.

In some embodiments, the first power rail is disposed at a first side of the memory device and the memory device further comprises a conductive line and a word line driver. The conductive line corresponds to the word line and is disposed at a second side, above the first side, of the memory device. The word line driver generates a word line voltage on the conductive line according to a second supply voltage. The suppressing circuit reduces the word line voltage for a voltage range.

In some embodiments, the memory device further comprises an enabling circuit. The enabling circuit comprises a third transistor disposed at the second layer. The third transistor and the suppressing circuit are coupled in series. The third transistor turns on in response to a control signal associated with the word line voltage to enable the suppressing circuit.

In some embodiments, a width of the first power rail is larger than a width of the conductive line.

In some embodiments, the suppressing circuit further comprises a conductive structure extending from the first layer to the second layer. The first transistor is of a first conductive type and the second transistor is of a second conductive type different to the first conductive type. A first terminal of the first transistor is coupled to the word line and a second terminal of the first transistor is coupled to a gate of the first transistor. A first terminal of the second transistor is coupled to the second terminal of the first transistor through the conductive structure and is coupled to a gate of the second transistor. A second terminal of the second transistor is coupled to the first power rail.

In some embodiments, the memory device further comprises a control circuit. The control circuit comprises a third transistor that is of the second conductive type and disposed at the second layer. The third transistor is coupled between the first terminal of the second transistor and the first power rail and turns on in response to a control signal associated with a voltage of the word line.

In some embodiments, the suppressing circuit further comprises a conductive structure extending from the first layer to the second layer. The first transistor is of a first conductive type and the second transistor is of a second conductive type different to the first conductive type. A first terminal and a gate of the first transistor are coupled to the word line. A first terminal of the second transistor is coupled to a second terminal of the first transistor through the conductive structure, and a second terminal and a gate of the second transistor are coupled to the first power rail.

In some embodiments, the memory device further comprises a control circuit comprising a third transistor that is of the first conductive type and disposed at the second layer. The third transistor is coupled between the first terminal of the second transistor and the first power rail and turns on in response to a control signal associated with a voltage of the word line.

In some embodiments, an integrated circuit is provided. The integrated circuit comprises a driver circuit and a suppressing circuit. The driver circuit generates a word line voltage at a word line according to a power supply voltage. The suppressing circuit is coupled between the word line and a power rail and reduces the word line voltage in response to the power supply voltage being over a threshold and comprises first to fourth active regions. The first and second active regions are disposed at a first semiconductor layer. The third and fourth active regions are disposed at a second semiconductor layer under the first semiconductor layer. The third active region is coupled to the second active region. The first active region and the second active region overlap the third active region and the fourth active region respectively in a layout view.

In some embodiments, the first and second active regions are of a first conductive type, and the third and fourth active regions are of a second conductive type. The suppressing circuit further comprises a first gate, a second gate and an insulating layer. The first gate is disposed between the first and second active regions and is coupled to the second active region. The second gate is disposed between the third active region and the fourth active region, and is coupled to the third active region. The insulating layer is disposed between the first gate and the second gate and is configured to electrically insulate the first gate from the second gate. The first gate, the second gate and the insulating layer overlap each other in the layout view.

In some embodiments, the third and fourth active regions are of a first conductive type, and the first and second active regions are of a second conductive type. The suppressing circuit further comprises a first gate and a second gate. The first gate is disposed between the first and second active regions and is coupled to the first active region and the word line. The second gate is disposed between the third active region and the fourth active region and is coupled to the fourth active region. The first gate and the second gate are electrically insulated and overlap each other in the layout view.

In some embodiments, the driver circuit comprises an inverter receiving a control voltage and to output the word line voltage according to the control voltage. The first active region is coupled to the word line. The integrated circuit further comprises a fifth active region and a gate. The fifth active region is disposed at the second semiconductor layer and is coupled to the power rail. The gate is disposed between the third and fifth active regions and is configured to receive the control voltage.

In some embodiments, the suppressing circuit further comprises a fifth active region, a sixth active region and a gate. The fifth active region is disposed at the first semiconductor layer and is coupled to the fourth active region. The sixth active region is disposed at the first semiconductor layer and is coupled to the word line. The gate is disposed between the fifth and first active regions and is configured to receive a control voltage for enabling the suppressing circuit.

In some embodiments, the suppressing circuit further comprises a fifth active region, a sixth active region and a gate. The fifth active region is disposed at the first semiconductor layer and is coupled to the third active region. The sixth active region is disposed at the first semiconductor layer and is coupled to the word line. The gate is disposed between the fifth and sixth active regions and is coupled to the word line.

In some embodiments, an integrated circuit is provided. The integrated circuit comprises a first conductive line, a first gate and a second gate, a first active region, a second active region and a first conductive structure. The first conductive line is disposed on a first side of the integrated circuit and transmits a word line signal. The first and second gates extend along a first horizontal direction and are separated from each other along a vertical direction. The first and second active regions are arranged on first and second sides of the first gate along a second horizontal direction perpendicular to the first horizontal direction. The first active region is coupled to the first conductive line. The first gate, the first active region and the second active region are included in a first structure operating as a first transistor. The third and fourth active regions are arranged on first and second sides of the second gate along the second horizontal direction. The second gate, the third active region and the fourth active region are included in a second structure operating as a second transistor. The first conductive structure extends along the vertical direction and couples the second active region to the third active region.

In some embodiments, the integrated circuit further comprises a second conductive line and a word line. The second conductive line is disposed on the first side and is configured to transmit a first supply voltage. The word line driver generates the word line signal according to the first supply voltage. The first transistor and the second transistor turn on to pull down a word line voltage in response to the first supply voltage exceeding a threshold.

In some embodiments, the integrated circuit further comprises a third conductive line, a third gate, fifth and sixth active regions. The third conductive line is disposed on a second side, opposite to the first side in the vertical direction, of the integrated circuit and transmits a second supply voltage lower than the first supply voltage. The third gate is separated from the first and second gates and extends along the first horizontal direction. The fifth and sixth active regions are arranged on first and second sides of the third gate along the second horizontal direction. The fifth active region is coupled to the fourth active region and the sixth active region is coupled to the third conductive line. The third gate, the fifth active region and the sixth active region are included in a third structure operating as a third transistor. The third transistor turns on in response to a pulse generated by a control signal generator to enable the pulling down the word line voltage.

In some embodiments, when the word line driver pulls up the word line voltage during a time internal between a first time to a second time, the control signal generator generates the pulse to turn on the third transistor from the first time to a third time earlier than the second time for reducing the word voltage from the first time to the third time.

In some embodiments, the first transistor is p-type and the second transistor is n-type, wherein the integrated circuit further comprises a second conductive structure and a third conductive structure. The second conductive structure that is disposed on the first side of the integrated circuit and couples the first gate to the second active region. The third conductive structure is disposed on the second side of the integrated circuit and couple the second gate to the third active region.

In some embodiments, the first transistor is n-type and the second transistor is p-type. The integrated circuit further comprises a second conductive structure and a third conductive structure. The second conductive structure is disposed on the first side of the integrated circuit and couple the first gate to the first active region. The third conductive structure that is disposed in the second side of the integrated circuit and is configured to couple the second gate to the fourth active region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A memory device, comprising:
a memory cell coupled to a word line;
a first power rail configured to transmit a first supply voltage; and
a suppressing circuit, comprising:
a first transistor that is diode-connected, coupled to the word line, and is disposed at a first layer; and
a second transistor that is diode-connected, coupled between the first transistor and the first power rail, and is disposed at a second layer under the first layer, wherein the first transistor and the second transistor overlap with each other in a layout view, wherein the first transistor and the second transistor are disposed under the word line and above the first power rail along a stacking direction of the first and second layers for coupling the word line to the first power rail.

2. The memory device of claim 1, wherein the first power rail is disposed at a first side of the memory device and the memory device further comprises:

a conductive line corresponding to the word line and disposed at a second side, above the first side, of the memory device; and a word line driver configured to generate a word line voltage on the conductive line according to a second supply voltage, wherein the suppressing circuit is configured to reduce the word line voltage for a voltage range.

3. The memory device of claim 2, further comprising:

an enabling circuit comprising a third transistor disposed at the second layer, wherein the third transistor and the suppressing circuit are coupled in series, wherein the third transistor is configured to turn on in response to a control signal associated with the word line voltage to enable the suppressing circuit.

4. The memory device of claim 2, wherein a width of the first power rail is larger than a width of the conductive line.

5. The memory device of claim 1, wherein the suppressing circuit further comprises a conductive structure extending from the first layer to the second layer, wherein the first transistor is of a first conductive type and the second transistor is of a second conductive type different to the first conductive type, wherein a first terminal of the first transistor is coupled to the word line and a second terminal of the first transistor is coupled to a gate of the first transistor, wherein a first terminal of the second transistor is coupled to the second terminal of the first transistor through the conductive structure and is coupled to a gate of the second transistor, and a second terminal of the second transistor is coupled to the first power rail.

6. The memory device of claim 5, further comprising:

a control circuit comprising:

a third transistor that is of the second conductive type and disposed at the second layer, wherein the third transistor is coupled between the first terminal of the second transistor and the first power rail and is configured to turn on in response to a control signal associated with a voltage of the word line.

7. The memory device of claim 1, wherein the suppressing circuit further comprises a conductive structure extending from the first layer to the second layer, wherein the first transistor is of a first conductive type and the second transistor is of a second conductive type different to the first conductive type, wherein a first terminal and a gate of the first transistor are coupled to the word line, wherein a first terminal of the second transistor is coupled to a second terminal of the first transistor through the conductive structure, and a second terminal and a gate of the second transistor are coupled to the first power rail.

8. The memory device of claim 7, further comprising:

a control circuit comprising:

a third transistor that is of the first conductive type and disposed at the second layer, wherein the third transistor is coupled between the first terminal of the second transistor and the first power rail and is configured to turn on in response to a control signal associated with a voltage of the word line.

9. An integrated circuit, comprising:

a driver circuit configured to generate a word line voltage at a word line according to a power supply voltage;

a suppressing circuit that is coupled between the word line and a power rail and is configured to reduce the word line voltage in response to the power supply voltage being over a threshold, and comprising:

first and second active regions disposed at a first semiconductor layer; and third and fourth active regions disposed at a second semiconductor layer under the first semiconductor layer, wherein the third active region is coupled to the second active region, wherein the first active region and the second active region overlap the third active region and the fourth active region respectively in a layout view, a control circuit comprising:

a transistor that is separated from the word line, coupled to the second and third active regions and configured to be turned on in response to the word line voltage pulled down.

10. The integrated circuit of claim 9, wherein the first and second active regions are of a first conductive type, and the third and fourth active regions are of a second conductive type, wherein the suppressing circuit further comprises:

a first gate that is disposed between the first and second active regions and coupled to the second active region;

a second gate that is disposed between the third active region and the fourth active region and coupled to the third active region; and an insulating layer that is disposed between the first gate and the second gate and is configured to electrically insulate the first gate from the second gate, wherein the first gate, the second gate and the insulating layer overlap each other in the layout view.

11. The integrated circuit of claim 9, wherein the third and fourth active regions are of a first conductive type, and the first and second active regions are of a second conductive type, wherein the suppressing circuit further comprises:

a first gate that is disposed between the first and second active regions and coupled to the first active region and the word line; and a second gate that is disposed between the third active region and the fourth active region and coupled to the fourth active region, wherein the first gate and the second gate are electrically insulated and overlap each other in the layout view.

12. The integrated circuit of claim 9, wherein the driver circuit comprises an inverter configured to receive a control voltage and to output the word line voltage according to the control voltage, wherein the first active region is coupled to the word line, wherein the integrated circuit further comprises:

a fifth active region that is disposed at the second semiconductor layer and is coupled to the power rail; and a gate that is disposed between the third and fifth active regions and is configured to receive the control voltage.

13. The integrated circuit of claim 9, wherein the suppressing circuit further comprises:
- a fifth active region that is disposed at the first semiconductor layer and is coupled to the fourth active region;
- a sixth active region that is disposed at the first semiconductor layer and is coupled to the word line; and
- a gate that is disposed between the fifth and first active regions and is configured to receive a control voltage for enabling the suppressing circuit.

14. The integrated circuit of claim 9, wherein the suppressing circuit further comprises:
- a fifth active region that is disposed at the first semiconductor layer and is coupled to the third active region;
- a sixth active region that is disposed at the first semiconductor layer and is coupled to the word line; and
- a gate that is disposed between the fifth and sixth active regions and is coupled to the word line.

15. An integrated circuit, comprising:
- a first conductive line disposed on a first side of the integrated circuit and configured to transmit a word line signal;
- first and second gates that extend along a first horizontal direction and are separated from each other along a vertical direction;
- first and second active regions arranged on first and second sides of the first gate along a second horizontal direction perpendicular to the first horizontal direction, wherein the first active region is coupled to the first conductive line,
- wherein the first gate, the first active region and the second active region are included in a first structure operating as a first transistor;
- third and fourth active regions arranged on first and second sides of the second gate along the second horizontal direction, wherein the second gate, the third active region and the fourth active region are included in a second structure operating as a second transistor;
- a first conductive structure extending along the vertical direction and configured to couple the second active region to the third active region; and
- a second conductive line disposed on the first side and configured to transmit a first supply voltage,
- wherein the first structure and the second structure are disposed under the first conductive line and above the second conductive line along the vertical direction for coupling the first conductive line to the second conductive line.

16. The integrated circuit of claim 15, further comprising:
- a word line driver configured to generate the word line signal according to the first supply voltage,
- wherein the first transistor and the second transistor are configured to turn on to pull down a word line voltage in response to the first supply voltage exceeding a threshold.

17. The integrated circuit of claim 16, further comprising:
- a third conductive line disposed on a second side, opposite to the first side in the vertical direction, of the integrated circuit and configured to transmit a second supply voltage lower than the first supply voltage;
- a third gate separated from the first and second gates and extending along the first horizontal direction; and
- fifth and sixth active regions arranged on first and second sides of the third gate along the second horizontal direction, wherein the fifth active region is coupled to the fourth active region and the sixth active region is coupled to the third conductive line,
- wherein the third gate, the fifth active region and the sixth active region are included in a third structure operating as a third transistor,
- wherein the third transistor is configured to turn on in response to a pulse generated by a control signal generator to enable the pulling down the word line voltage.

18. The integrated circuit of claim 17, wherein when the word line driver pulls up the word line voltage during a time internal between a first time to a second time,
- the control signal generator is configured to generate the pulse to turn on the third transistor from the first time to a third time earlier than the second time for reducing the word line voltage from the first time to the third time.

19. The integrated circuit of claim 15, wherein the first transistor is p-type and the second transistor is n-type,
- wherein the integrated circuit further comprises:
  - a second conductive structure that is disposed on the first side of the integrated circuit and is configured to couple the first gate to the second active region; and
  - a third conductive structure that is disposed on the second side of the integrated circuit and is configured to couple the second gate to the third active region.

20. The integrated circuit of claim 15, wherein the first transistor is n-type and the second transistor is p-type,
- wherein the integrated circuit further comprises:
  - a second conductive structure that is disposed on the first side of the integrated circuit and is configured to couple the first gate to the first active region; and
  - a third conductive structure that is disposed in the second side of the integrated circuit and is configured to couple the second gate to the fourth active region.

* * * * *